(12) United States Patent
Manautou et al.

(10) Patent No.: US 11,726,439 B1
(45) Date of Patent: Aug. 15, 2023

(54) RAPID DISEASE RESPONSE VIA PARTICLE MONITORING

(71) Applicant: Scanit Technologies, Inc., Fremont, CA (US)

(72) Inventors: Pedro Manautou, Milpitas, CA (US); Glenn Wanke, St. Petersburg, FL (US)

(73) Assignee: ScanIt Technologies, Inc., Fremont, CA (US)

( * ) Notice: Subject to any disclaimer, the term of this patent is extended or adjusted under 35 U.S.C. 154(b) by 320 days.

(21) Appl. No.: 16/894,780

(22) Filed: Jun. 6, 2020

Related U.S. Application Data

(60) Provisional application No. 62/858,938, filed on Jun. 7, 2019.

(51) Int. Cl.
  *G05B 19/042* (2006.01)
  *G06Q 50/02* (2012.01)
  *G06T 7/00* (2017.01)

(52) U.S. Cl.
  CPC .......... *G05B 19/042* (2013.01); *G06Q 50/02* (2013.01); *G05B 2219/2614* (2013.01); *G06T 7/0002* (2013.01); *G06T 2207/30188* (2013.01)

(58) Field of Classification Search
  CPC .......... G05B 19/042; G05B 2219/2614; G06Q 50/02; G06T 7/0002; G06T 2207/30188
  See application file for complete search history.

(56) References Cited

U.S. PATENT DOCUMENTS

| | | | |
|---|---|---|---|
| 2016/0290912 A1* | 10/2016 | Kent | G01N 15/0612 |
| 2017/0349957 A1* | 12/2017 | Champagne | C12N 1/145 |
| 2020/0103328 A1 | 4/2020 | Ozcan | |
| 2020/0134741 A1* | 4/2020 | Bongartz | G06Q 10/0639 |
| 2020/0340901 A1 | 10/2020 | Ozcan | |

FOREIGN PATENT DOCUMENTS

WO  WO2018165590  9/2018

OTHER PUBLICATIONS

"AgroScout," available at <https://agro-scout.com>, retrieved Jun. 5, 2020, 8 pages.
"Motorleaf," available at <https://motorleaf.com/how-it-works/>, retrieved Jun. 5, 2020, 7 pages.

* cited by examiner

*Primary Examiner* — Michael W Choi
(74) *Attorney, Agent, or Firm* — Staniford Tomita LLP

(57) ABSTRACT

In an embodiment, a rapid response system includes a manager coupled to one or more sensors and one or more controls. The one or more sensors includes a camera-sensor based detector of airborne pathogenic biological particles. Settings of the one or more controls influence a rate of a growth or lifecycle of biological pathogens. The manager rapidly responds to sensor detection of airborne pathogenic biological particles by influencing the rate of growth or lifecycles of biological pathogens via modification of control settings.

10 Claims, 14 Drawing Sheets

| Input Ecosystem | Precision Action | Sustained Health |
|---|---|---|
| Airborne spores | Lighting Strategy | Max Yields |
| Climate | Climate Control | Optimized Costs |
| Sensors | Precision Treatment | |

Airborne Spores

Figure 1B

Management Software → Controls → Plant Environment / Plants / Pathogens → Sensors → Management Software

Figure 2

```
┌─────────────────────────────────────────────────────────┐
│ Deploy monitor in a controlled environment agriculture  │
│ (CEA) site to perform in-situ monitoring and            │
│ measurement of airborne spore density (ASD)             │
│ associated with a pathogen                              │
│                        1510                             │
└─────────────────────────────────────────────────────────┘
                             │
                             ▼
        ┌──────────────────────────────────────┐
        │    Configure ASD threshold levels    │
        │                 1515                 │
        └──────────────────────────────────────┘
                             │
                             ▼
     ┌────────────────────────────────────────────┐
     │ Establish communications between the       │
     │ monitor and external sensors and controls  │
     │                    1520                    │
     └────────────────────────────────────────────┘
                             │
                             ▼
     ┌────────────────────────────────────────────┐
     │  Receive data streams from the external    │
     │                sensors                     │
     │                  1525                      │
     └────────────────────────────────────────────┘
                             │
                             ▼
     ┌────────────────────────────────────────────┐
     │ Determine that a particular threshold      │
     │        level has been reached              │
     │                  1530                      │
     └────────────────────────────────────────────┘
              ↙                          ↘
┌──────────────────────────┐   ┌──────────────────────────┐
│ Generate an alert for a  │   │ Issue commands to        │
│        grower            │   │ controls for actions     │
│          1535            │   │          1540            │
└──────────────────────────┘   └──────────────────────────┘
```

Figure 15

```
┌─────────────────────────────────────┐
│            Drone/Robot              │
│                                     │
│     ┌─────────────────────────┐     │
│     │     Monitor Device      │     │
│     │                         │     │
│     └─────────────────────────┘     │
│                                     │
└─────────────────────────────────────┘
```

Figure 16

RAPID DISEASE RESPONSE VIA PARTICLE MONITORING

CROSS-REFERENCE TO RELATED APPLICATIONS

This application claims the benefit of U.S. provisional patent application 62/858,938, filed Jun. 7, 2019, and is incorporated by reference along with all other references cited in this application.

TECHNICAL FIELD

The present invention relates to the field of agriculture, and more specifically, to controlled environment agriculture (CEA) including the operation of indoor plant farms such as sunlight-based green houses and artificial-light-based "plant factories."

BACKGROUND

Controlled environment agriculture (CEA) is a technology-based approach toward food production. The aim of CEA is to provide protection and maintain optimal growing conditions throughout the development of the crop. Production takes place within an enclosed growing structure such as a greenhouse or building. Plants are often grown using hydroponic methods in order to supply the proper amounts of water and nutrients to the root zone.

Indoor farming is a type of CEA. Indoor farming can offer a number of benefits over traditional outdoor farming techniques. Indoor farming generally uses less water, and space than traditional field-grown crops. Indoor farming also allows farmers to grow crops throughout the winter seasons.

There remains, however, a continuing demand for increased efficiencies and higher yields in indoor farming. In particular, there is a need to detect airborne pathogens before infestation of the crops to enable preventative action to be taken.

BRIEF SUMMARY OF THE INVENTION

Indoor crops are still susceptible to pathogenic molds or bacteria. It is desirable to provide a computer system to control the plant environment (light, temperature, humidity, ventilation, etc.) to help manage, reduce, or eliminate damage from pathogenic molds or bacteria. It is desirable to provide detection of airborne biological particles within feedback loops, as well as provide associated techniques, systems, software, components, modules, and logic to intelligently control the indoor plant environment. In an embodiment, the aspects and principles disclosed may be applied to industries and fields other than crop protection and indoor agriculture, such as cold storage and food transportation.

In an embodiment, a rapid response system includes a manager coupled to one or more sensor and one or more controls. The one or more sensors includes a camera-sensor based detector of airborne pathogenic biological particles. Settings of the one or more controls influence a rate of a growth or lifecycle of biological pathogens. The manager rapidly responds to sensor detection of airborne pathogenic biological particles by influencing the rate of growth or lifecycles of biological pathogens via modification of control settings.

In an embodiment, there is a disease response system based on lighting controls, climate controls, heat, cold blasts, or combinations of these that can help reduce crop disease and increase yields while reducing reliance on pesticides.

Other objects, features, and advantages will become apparent upon consideration of the following detailed description and the accompanying drawings, in which like reference designations represent like features throughout the figures.

BRIEF DESCRIPTION OF THE FIGURES

FIGS. 1A and 1B show simplified block diagrams of a system for controlled environment agriculture (CEA), according to one or more embodiments.

FIG. 2 shows a block diagram illustrating a feedback loop in indoor agriculture which embodiments may be implemented.

FIG. 15 shows a flow for rapid disease response, according to one or more embodiments.

FIG. 16 shows a block diagram of a drone or robot having a monitor, according to one or more embodiments.

DETAILED DESCRIPTION

Figure 1A:
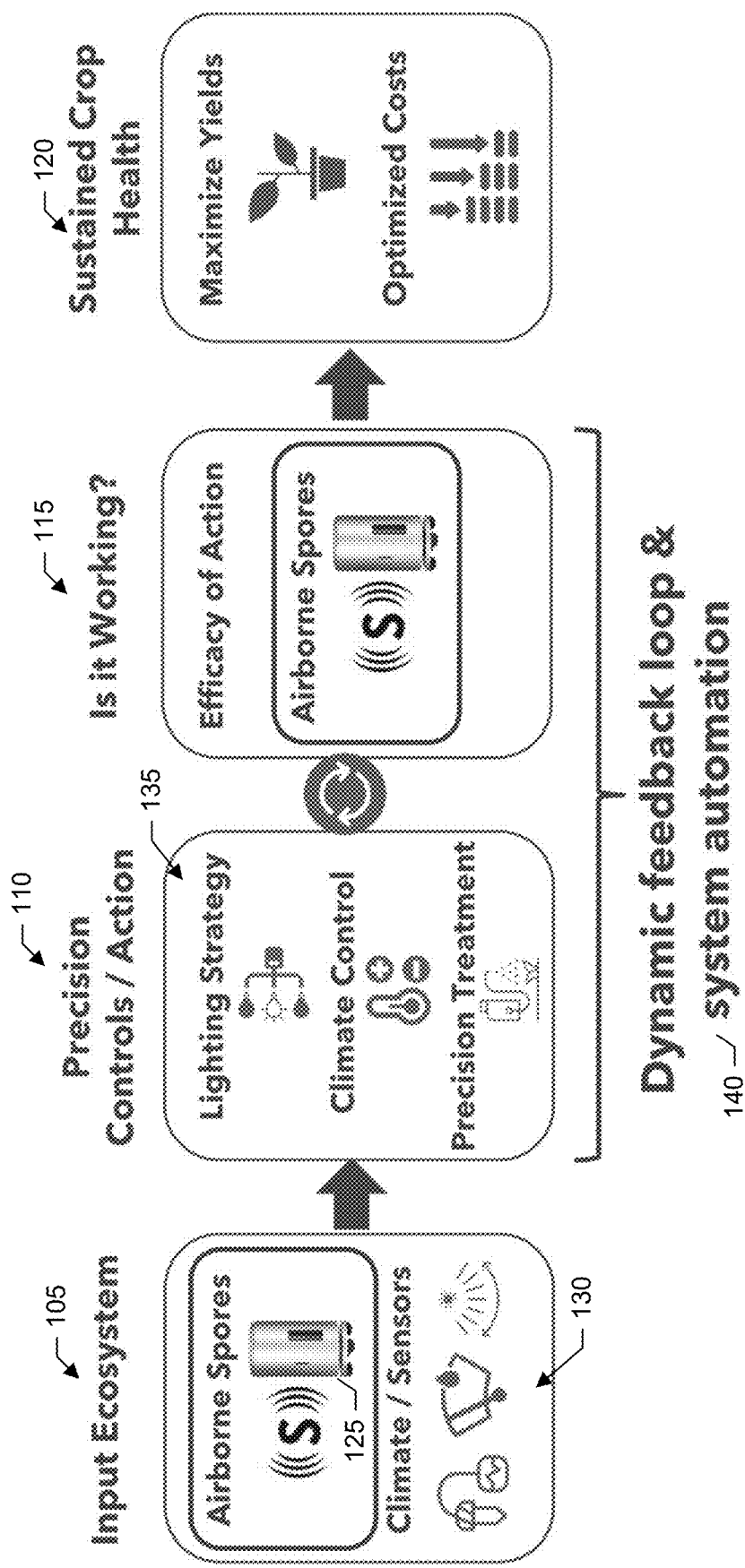

FIGS. 1A and 1B show simplified block diagrams of a system for controlled environment agriculture (CEA), according to one or more embodiments. The figures show a progression of stages for system operation. In a specific embodiment, the system is implemented as an indoor plant monitoring system. It is to be understood that for concreteness examples of 'indoor' agriculture are given. It should be appreciated, however, that the systems and techniques described can be applied to other types of 'controlled environment agriculture' of which indoor agriculture is but one example.

In a specific embodiment, a particle monitor is connected to a lighting system, climate control system, watering system, treatment system, or combinations of these. An example of a particle monitor is the Scanit Particle Monitor or Sporecam as provided by Scanit Technologies of Fremont, Calif. In a specific embodiment, the lighting system, climate control system, watering system, treatment system, or combinations of these are provided by a third party. One example of a third party having a lighting system that the particle monitor may interface with is LumiGrow of Emeryville, Calif. Appendix A includes a discussion of a particle monitor integrating with a third party system, e.g., LumiGrow. Some embodiments are described in conjunction with LumiGrow. It should be appreciated, however, that aspects and principles of the systems and techniques described can be applied to or used with indoor grow systems provided by other third party vendors.

As shown in the example of FIG. 1A, there is an input ecosystem block 105, precision controls/action block 110, assessment ("is it working") block 115, and sustained crop health block 120.

The input ecosystem includes a particle monitor 125. The particle monitor may be referred to as a camera-sensor based detector of airborne pathogenic biological particles, spore detector, or airborne spore density (ASD) monitor. The monitor may be referred to as Sporecam™ as provided by Scanit Technologies. The monitor may be communicatively connected to a set of sensors 130 and controls 135 external to the monitor. The sensors may include climate sensors (e.g., temperature sensor, humidity sensor, carbon dioxide sensors), light detectors, soil moisture sensors, nutrient concentration sensors, nutrient concentration sensors, and other agricultural sensors. The controls may include an agricultural lighting system, climate control system, irrigation system, agricultural treatment system (e.g., fungicide dispensing system), and other agricultural control systems.

In a specific embodiment, the monitor detects airborne spores within an "input ecosystem" such as an indoor farm or other CEA site. Spore detection may then rapidly result in one or more "precision action" such as a modification of lighting, temperature, humidity, application of fungicides, or combinations of these. Appropriate "precision actions" may then stop or delay mold spores from infecting plants and damaging crops, thus leading to "maximum yields" or better yields and lower costs. This may be described as "rapid disease response." The assessment and precision controls/action blocks are arranged in a dynamic feedback loop of system automation 140.

In a specific embodiment, the modification of settings associated with the controls may include manual modification, autonomous modification, or both. For example, in some cases, an indoor farm may include a lighting system that is not connected to the particle monitor system. In this case, the particle monitor system may transmit an alert message to a client device (e.g., smartphone) of the grower, that advises the grower to adjust the lights of the lighting system. In other cases, the lighting system may be connected to the particle monitor system. In this case, the particle monitor system may automatically (e.g., without human intervention) adjust the lights of the lighting system. There can be a combination of manual and autonomous adjustments. For example, an indoor farm may include some control systems (e.g., lighting system) that are connected to the particle monitor system and other control systems (e.g., irrigation system) that are not connected to the particle monitor system. Settings for control systems that are connected to the particle monitor system may be modified autonomously. Settings for control systems that are not connected to the particle monitor system may be modified manually.

In a specific embodiment, the dynamic feedback loop facilitates operation of a fast feedback loop system in which disease mitigating actions can be rapidly performed on a continuous basis to prevent an outbreak of a disease. These disease mitigating actions may include automatic actions (e.g., automatically adjusting settings of a control system), manual actions (e.g., transmitting to a grower an alert message recommending that settings of a control system be adjusted), or both. In a specific embodiment, the monitor collects airborne spores over time and analyzes the spores to generate spore data. In this specific embodiment, the monitoring system may correlate, based on time, the spore data to one or more other inputs received from one or more external sensors to determine whether an alert should be generated. For example, there can be spore data associated with detection or collection of airborne spores at a particular time. There can be data received from external climate sensors contemporaneous with the particular time. The particle monitor system may correlate the spore data with the data received from the external climate sensors based on the common times of the spore detection and climate events.

In a specific embodiment, the particle monitor forms at least a portion of a fast feedback system having logic, algorithms, processes, and intelligence which when executed instruct the particle monitor to modify its scanning settings based on having detected indicia of potential pathogens. For example, in a specific embodiment, the particle monitor may perform preliminary scans of airborne particles that have been collected. If a preliminary scan detects certain indicia of potential pathogens, the particle monitor may shift into performing an in-depth or advanced scan to help confirm the presence (or lack) of the pathogen.

Conventional methods may be described as "slow disease response." With conventional slow disease response, airborne spores are not detected and the need for action is only recognized after mold spores have infected plans and furthermore the infection has progressed far enough to yield visible plant or crop damage. At this point, actions tend to be expensive, if not necessarily effective. By avoiding such expenses, rapid disease response "optimizes costs" or reduces costs.

Indoor agriculture and associated technology is evolving rapidly. One reason for this is that the world's growing population is outstripping available arable land. A related motivation for indoor agriculture is the unique benefits of growing plants in a controlled indoor environment. In contrast to outdoor agriculture, indoor farming including "plant factories" enable software control of the lighting, temperature, humidity, etc. of the plant's growing environment. Even in greenhouses based on sunlight, software, executed by a computer processor or stored on computer readable media, may have control of temperature, humidity, etc., if not full control over lighting.

FIG. 2 shows a block diagram illustrating a feedback loop in indoor agriculture which embodiments may be implemented. At the bottom of the feedback-loop diagram is the plant environment, plants and possibly pathogens. The growth of any pathogens present is affected by the state of plant growth as well as the plant environment. In indoor agriculture, such as plant factories, many aspects of the plant environment, such as lighting conditions, temperature, humidity, air circulation, nutrients available to roots, etc., may be controlled by lights, heat pumps, air conditioners, fans, pumps, etc. This is represented in the diagram by the box labeled "Controls." "Management Software" decides how to manipulate these controls in order to achieve the desired plant environmental conditions. To complete the feedback loop, "Sensors" inform the Management Software about the state of the plant environment, plants and pathogens.

A feedback loop can be used to control, for example, the temperature of the air surrounding the plants. Home heater/thermostat systems can use a similar feedback loop.

In some cases the feedback loop may be fully automated. In other cases the feedback loop may involve Management Software sending alerts to human operators who then manipulate controls to achieve the desired effect.

In a specific embodiment, systems and techniques are provided for the use of such feedback loops to control the plant environment in such a way that the plants thrive and pathogens do not.

Fast Detection of Airborne Particles:

Early detection is key to the success of feedback loops intended to suppress or eliminate effects of pathogens. Airborne detectors of biological particles, such as developed by Scanit Technologies and described in U.S. Pat. No. 10,458,990, issued Oct. 29, 2019; U.S. Pat. No. 10,330,578, issued Jun. 25, 2019; and U.S. Pat. No. 9,933,351, issued Apr. 3, 2018, which are incorporated by reference, enable such fast feedback. In a specific embodiment, "Sensors" in the above diagram include such automated particle detectors. The sensor of the particle detector or monitor as described here is different from simple particle sensors such as simple particle detectors and particle counters; the difference being that the particle detector (or particular monitor) as described herein can provide classification and speciation where the others may simply detect the presence of any particle and its size but does not know much about its taxonomy (e.g., classification, what it is).

Figure 3:
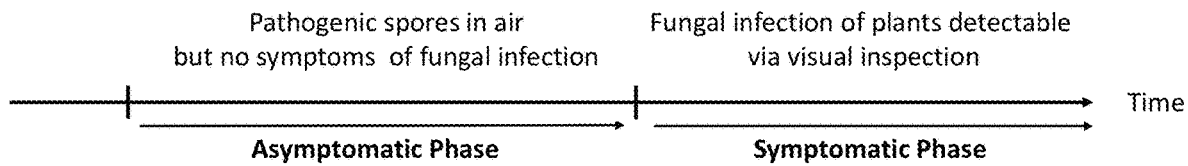
FIG. 3 shows a timing diagram illustrating the difference between the asymptomatic and symptomatic phases of a fungal infection.

FIG. 3 shows a timing diagram illustrating the difference between the asymptomatic and symptomatic phases of a fungal infection. In a specific embodiment, systems and techniques are provided to detect potential threats to crops during the asymptomatic phase.

Figure 4:
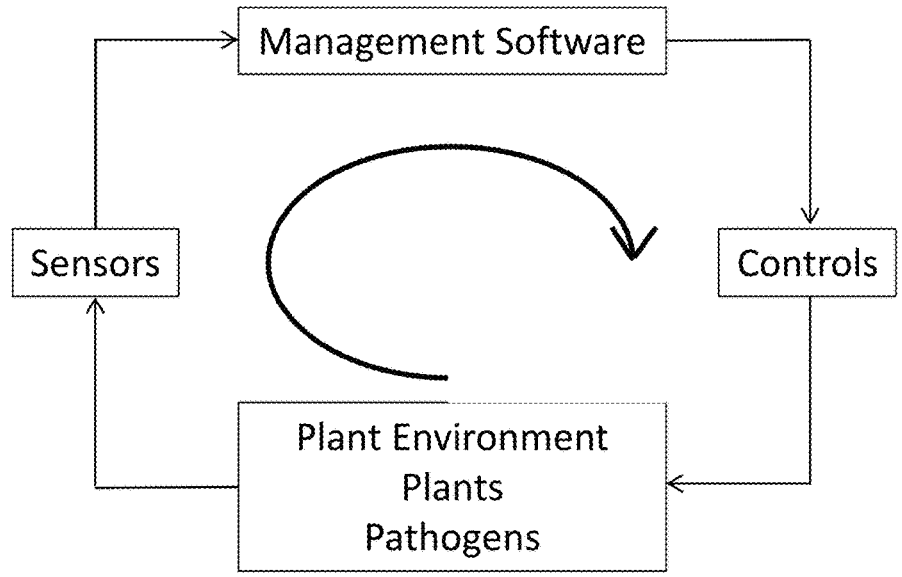
FIG. 4 illustrates one cycle through the feedback loop of FIG. 2 that according to one or more embodiments may occur entirely within the asymptomatic phase of a fungal infection.
Figure 5:
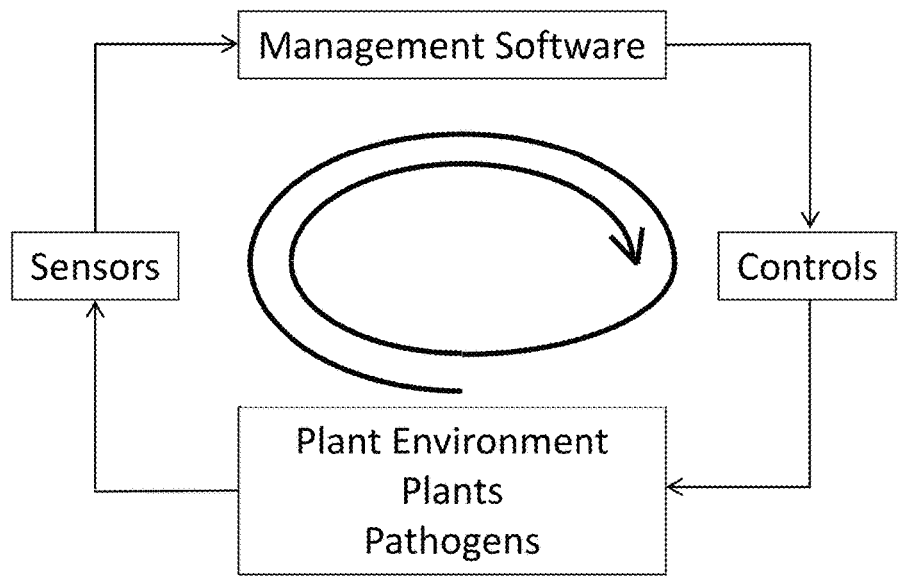
FIG. 5 illustrates two cycles through the feedback loop of FIG. 2 that according to one or more embodiments may occur entirely within the asymptomatic phase of a fungal infection.

Early detection preferably occurs within an "asymptomatic phase" of a fungal infection. As illustrated in FIG. 3, the asymptomatic phase precedes a symptomatic phase in which a fungal infection is detectable via conventional methods such as visual inspection of plants. In the preceding asymptomatic phase, the fungal infection is not detectable by conventional means and damage to plants and fruit have not yet occurred. The addition of a particle monitor, such as described in U.S. Pat. No. 9,993,351, dramatically changes the nature of the feedback loop of FIG. 2. Instead of waiting until the symptomatic phase of the fungal infection to execute the feedback look, it now becomes possible to execute the feedback loop once (see FIG. 4), twice (see FIG. 5) or more times during the asymptomatic phase before the symptomatic phase starts. This enables action to be taken in time to avoid crop damage.

Of particular interest are spores of pathological molds such as *Botrytis* (gray mold), Erysephe (powdery mildew), Downy Mildew, and many others. Also of interest are airborne particles that may be recognized as the result of bacterial infections of plants. More details are given later in this disclosure.

With fast feedback, there is less risk to using or experimenting with anti-fungal treatments that are more environmentally benign than standard synthetic-chemistry fungicides. For example, passive treatments of organics, such as tea tree oil, might be used to prevent or suppress fungal infections, but with some risk of not being as effective as desired. Fast feedback on fungal infections reduces the impact of any risk of ineffectiveness of a more benign fungicide by enabling prompt corrective action such as a rapid switch to another benign fungicide or to a less benign but more effective fungicide.

Sensors may either have fixed positions, or be movable. Movable sensors may be mounted on robots or drones which transport the sensors to positions where it is deemed of interest to sample ambient air (see, e.g., FIG. 16). In indoor agriculture such as a plant farm, a robot may move along rails provided for it. For outdoor agriculture, it may be desirable for the robot to take the form of a flying drone. In either case, the robot may carry a sensor with the ability to analyze particles as well as collect them. Alternatively, a robot may transport a particle collection device for ambient air sampling to various locations and then return to a fixed location where collected particles are analyzed. In yet another variation, a robot may transport a particle sensor with a tape media and the capability of collecting particles on the tape media and optically analyzing them, and then if and when particles of particular interest are identified the robot may then help transport the tape media to a location where it may then be shipped to a lab for wet chemistry analysis such as DNA genetic analysis. Such a lab may be inside the facility, nearby, or many miles away that may require the sample to be shipped further, thus delaying the analysis and time to results and risking contamination due to multiple handling steps.

Management Software & Artificial Intelligence (AI):

Feedback loops to control pathogen growth may well benefit from management software algorithms considerably more complex than that of a thermostat system. State-of-the-art developments in artificial intelligence "AI", neural networks, machine learning, analysis of large "learning" data sets may well have a role to play.

Today most farm management disease modeling and prediction using AI is post-infection using cameras and machine learning to try to predict. Some companies use post-infection camera based systems combined with environmental factors providing crop insights and modeling of disease. An example of an early disease model prior to AI models was the Gubler-Thomas Powdery Mildew index which took into account weather or ambient parameters, in particular humidity and temperature, to indicate the probability that powdery mildew disease will increase or decrease in the coming days also taking into account the weather forecast. This is done knowing that certain fungal and bacterial diseases thrive in certain ambient conditions and factors but not others after many years of research and field studies. The same is used by AI models today, these largely take into account post-infection images of diseases on plants together with ambient parameters in the crop area to and over time generate a model that helps describe whether or not disease is spreading or contracting against specific actions such as fungal sprays based on post-infection imaging analysis of the plants. It may take a few days to detect if the action taken had any effect in controlling disease. In many instances the AI models also require the user to enter the type of crop they are working with and even the geographical location with such that the correct AI models are applied for the type of diseases these are prone to and if these may even exist in the given geography.

Furthermore, some diseases attack plants in very slow ways such as bacterial infections and some soil born fungal diseases that affect roots and in some cases others that rot the stems and wood of the plant yet their spores spread in the air having significant impact on the operation long term. An example of a soil borne fungal spore is *Fusarium* which takes weeks to months for it to damage the plant root systems significantly where the plant suffers yellowing of leaves and wilting. Another one is *Coniothyrium* which rots the stems and woody tissue in some plants but takes a very a long time to become visible to the human and, or camera-based systems. By the time a camera-based AI system detects *Fusarium* related wilting and leaf yellowing it has been many weeks since an infection of *Fusarium* and spreading throughout most of the facility due to aeration and air ventilation. In the case of *Coniothyrium* it is practically invisible to the AI because for many plants these get harvested before symptoms become visible enough, likely a grower will see flowers not yielding properly and new sprouts failing to yield before woody tissue starts to change color, fall off, dry off, or soften. Roses in particular are harvested for many years with lots of cuttings before the mother plant is deemed unusable. Since the Rose canker spreads airborne there's a very high chance most of the Rose plant greenhouse plants are likely infected as well where the only solution could be a full purge of the stock and complete facilities sanitation using ClO2. In the meantime the AI model may only be seen and managing powdery mildew, perhaps some *botrytis* damage post-infection and made recommendations around fungal sprays and assessed it's efficacy days later but failed to detect and diagnose Rose canker disease early on because symptoms appear very slowly over a very long period of time.

In some instances a plant and/or grow area could also be suffering from sudden dehydration or sudden excess heat due to weather systems affecting the greenhouse or failed equipment like lack of ventilation where the AI model may not be able to correctly diagnose the symptoms unless it has access to spore information to rule out disease vs other event affecting the plant.

The AI intelligence at a grower's disposal may be also limited in the inputs it has to provide a complete assessment of disease. A grower may only have ambient data and no camera-based systems to look for post-infection problems and, or, vice versa, which limits the accuracy and scope of diseases that can be accurately modeled and efficacy actions monitored by by the AI as it pertains to plant diseases. Therefore a feedback loop that has a direct and fast measurement of airborne pathogenic spores is key in enhancing any shortfalls the AI models have around disease in a greenhouse.

In some instances, the management software may operate under pre-set suggested programs to run based on the disease detected and their counts. In others the management software may also incorporate modeling and simulations of various control parameters and a layout of the facility along with the type of crop and disease to be controlled that then suggest best types of controls to carry out during the actual plant grow cycle.

Further the management software may be adaptive, learning from experience. For example, management software incorporating modeling may at the end of a cycle compare the simulation predictions to the real-life actual results and then optimize itself for the next crop cycle. In this way it may make itself more robust around disease detection and prevention parameter controls.

Initial models in adaptive management software may be based on research results and best practices of relevant experts. Relevant experts may include suppliers of equipment that sense or control relevant input parameters such as HVAC, lighting, gasses, etc.

The placement of the spore detection sensors may be inside the canopy or slightly above it. Spore detection sensors may also be embedded into other infrastructure nodes inside the grow area such as lighting, HVAC lines, entry/outdoors, decontamination rooms. Spore detection sensors may also be embedded in moving carts/equipment in the facility. Other infrastructure may also provide spore detection sensors with electrical power as well as computing resources to manage and analyze data.

Figure 6:
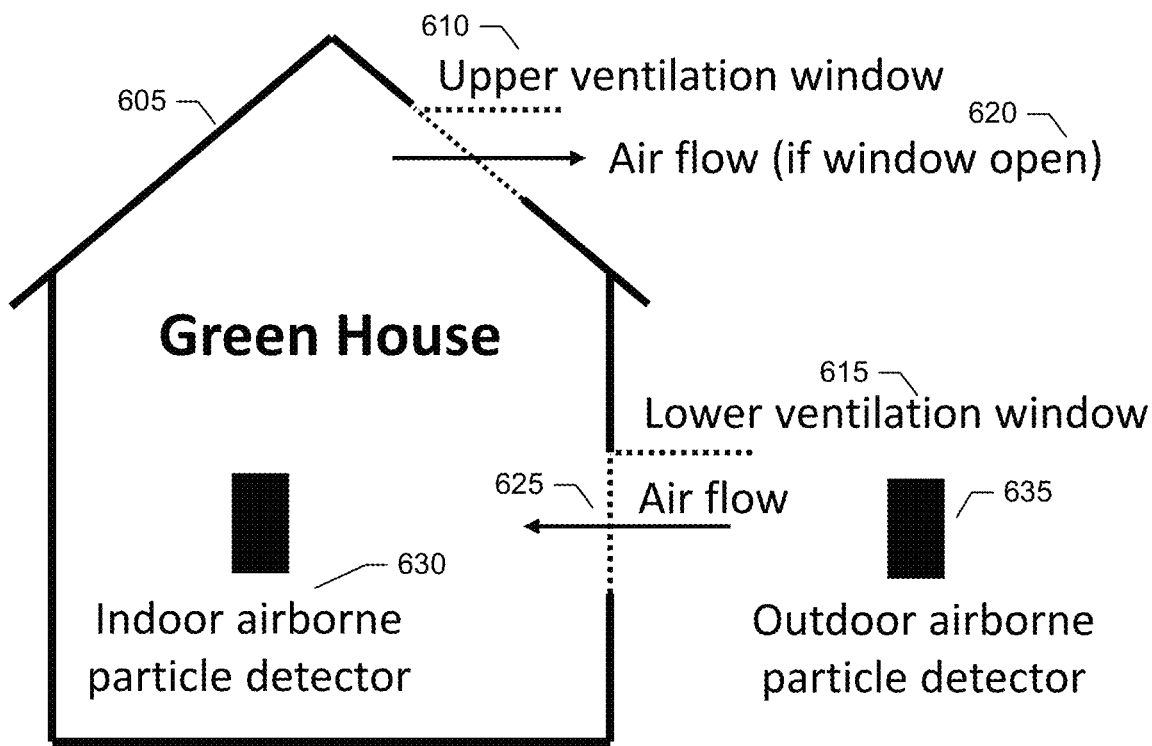
FIG. 6 illustrates a greenhouse application with both indoor and outdoor particle monitors.
Figure 7:
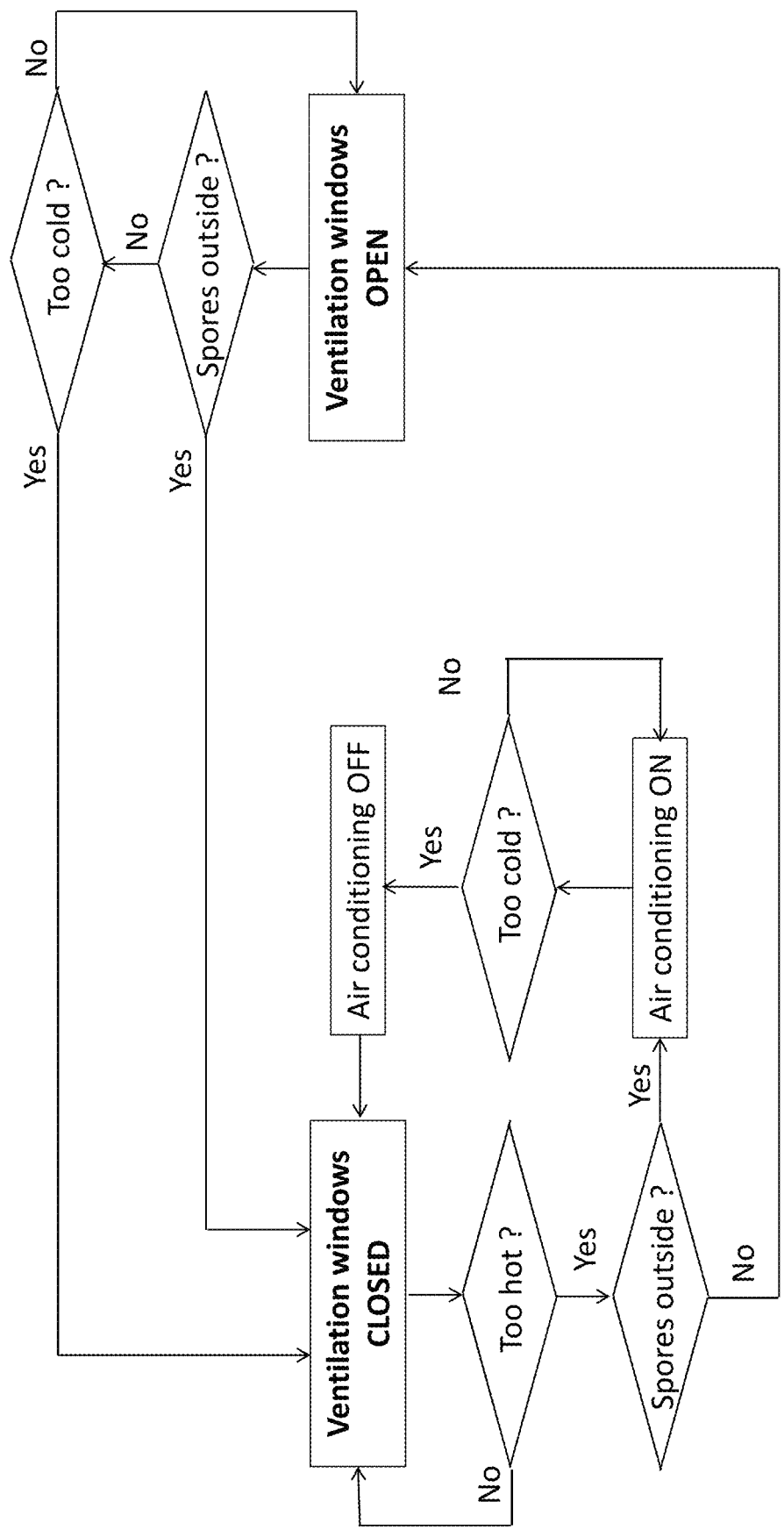
FIG. 7 illustrates a possible management software flow chart applicable to the greenhouse application of FIG. 6.

In some deployments the management software controls may also take into account data from spore detection sensors and other sensors outside the grow area. For example, some hybrid greenhouses and glasshouses are enclosed such that heat builds up in the facility and windows in the roof are opened for some period of time daily to help cool down the facility. In such cases, outside air and particulates will enter the facility. Access to outdoor particle sensor data enables management software may determine when it is safe to use outdoor air for cooling and when it is dangerous due to pathogenic spores in the outside air. For example, it may be wise to only use outdoor air for cooling when for several hours the outdoor spore sensor has not detected any pathogenic spores. FIGS. 6 and 7 illustrate such an embodiment.

FIG. 6 schematically illustrates a greenhouse 605 with lower and upper ventilation windows 610, 615 that, when opened, allow hot air 620 to escape out of the upper window while cool air 625 enters through the lower window. Indoor and outdoor particle monitors 630, 635 are also shown in the figure. As illustrated in the flow chart of FIG. 7, the management might not always open the windows when the greenhouse gets too hot, but rather may only open the windows for cooling when no dangerous spores are detected outside. As illustrated, if the greenhouse needs cooling, but outside air caries dangerous pathogens, the management software may decide instead to turn on an air conditioner despite the increased energy costs. However, occasionally turning on the air conditioner when spores are present outside is less costly and lower in carbon footprint than always relying on air conditioning due to lack of knowledge when cool air outside does not carry pathogens.

Sensor data on outdoor humidity, temperature and wind speed may also be relevant to management software's assessment of pathogenic risks. For example the risks may be lower when slow wind speeds are measured by wind sensors, or high humidity is detected and particles are less likely to be airborne due to sticking on condensation in outdoor plant and building surfaces. In a specific embodiment, data from the indoor particle monitor, outdoor particle monitor, or both is analyzed to determine one or more of when windows of the greenhouse should be opened, a duration that the windows should remain open, whether the windows should remain closed, or whether the greenhouse should be cooled using a technique other than opening the windows (e.g., activating an air conditioning system of the greenhouse).

Broad Range of Controls:

Once the Management Software recognizes there is a pathogen whose growth needs to be controlled, it is desirable that the Management Software has at its disposal a broad range of controls with which to suppress pathogen growth while benefitting, or at least not unduly harming, plant growth. Such a "tool box" of controls may include light intensity, spectrum and timing, air temperature and humidity, air circulation speed, $CO_2$ levels, nutrient levels, etc. More details are given later in this disclosure.

Management Software may not only make control decisions based on the type and amount pathogenic spores detected of a period of time, but also by discriminating between different metabolic states of spores of a given species. Methods for discriminating between spore states are described in U.S. Pat. No. 10,458,990, which is incorporated by reference along with all other references cited. For example, the age of a spore may be determined. If the spore population is dominated by "young spores," Management Software may recommend or automatically implement a heavy dose of lighting energy, perhaps of a specific wavelength. In contrast, if the spore population is predominately in an older metabolic state that is more susceptible to fast dehydration, the Management Software may recommend or implement a heat blast sufficient to manage the pathogen without undue stress on the plants. Detection of the state of detected spores enables higher precision responses.

In some embodiments, control measures may include the use for robots or drones. In other cases, control measures may be carried out by humans who receive requests form the management software.

In an agricultural facility growing multiple crops, each crop may have its own version of the feedback loop of FIG. 2. For example, if an indoor farm has tomatoes growing in a first room and lettuce growing in second room, the first room may have sensors tuned for the detection of tomato pathogens and management software with controls suited to treat infected tomato plants while the second room may have sensors tuned for the detection of lettuce pathogens and management software with controls suited to treat infected lettuce plants. While a detailed flow chart of all the feedback loops of a field installation may have considerable complexity, the principles and features of sensor/software/controls/pathogens feedback is well illustrated by the flow chart of FIG. 2.

Simultaneous Infections:

If more than one pathogen is present at the same time, greater demands are placed on the feedback loop. An airborne biological particle detector capable of detecting and recognizing more than one pathogen is desirable. The ability of the detector to be able to classify and differentiate between particle types is key. More intelligence is required of the Management Software to devise a strategy to control two or more pathogen infections while at the same time supporting desired plant growth. Furthermore, the possibility of simultaneous infections makes it only more desirable that the Management Software has the broadest possible "tool box" of controls with which to vary the many aspects of the plant environment.

Sterilization in Response to Particularly Dangerous Infection:

Some infections may be so virulent or out of control that the best course of action may be to completely destroy the infected crop and sterilize and sanitize the affected area. This might be described as the "nuclear option". In some applications where extremely fast response is essential, it may make sense for automated software to have the power to exercise this nuclear option, while in many applications it is appropriate to require human judgement to approve such drastic action. Whether an automated reflex or a human judgement call in response to an automated warning message, known sterilization methods may be applied. For example, a mist of chlorine dioxide ($ClO_2$) may be used to kill everything living and then dissipate without corroding infrastructure. Alternatives to chlorine dioxide are high-pH fluids like ammonia and low-pH (acidic) fluids like citric acid. Exposure to ultra-violet (UV) light is another known sterilization method, as is the use of disinfectant wipes. It is to be understood that the scope of "controls" in FIG. 2 may include such "nuclear options", particularly in indoor agriculture applications where instead of the open air, there may be a self-contained room in need of sterilization.

Climate Influence on Particle Monitor Operation

Figure 8:
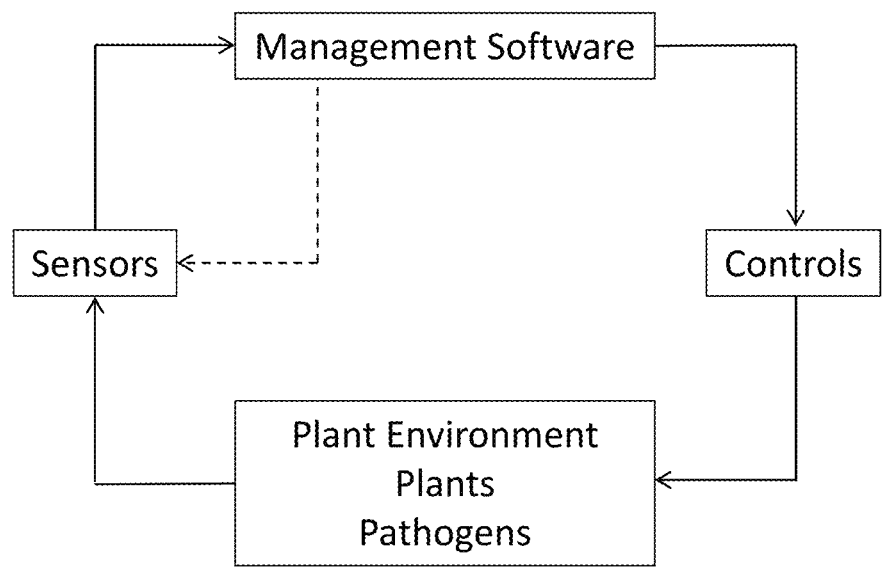
FIG. 8 shows a variant of FIG. 2 with an added dashed arrow to indicate that management software may use sensor data to modify how particle sensor data is collected.

FIG. 8 illustrates the feedback loop of FIG. 2 with a twist. The dashed arrow in FIG. 8 indicates the possibility that based on climate sensors, the management software may instruct the particle monitor to modify its operation. For example, the management software may have available to it a list of pathogens of possible concern, and for each pathogen of concern there may be known climate conditions (temperature, humidity and lighting, etc.) which are associated with dispersal of spores. When temperature sensors, humidity sensors, lighting sensors, etc. indicate conditions ripe for dispersal of spores of a particular pathogen, the management software may instruct the particle monitor to be extra vigilant for spores of the particular pathogen. Being "extra vigilant" may mean increasing the rate of air sampling, optimizing particle recognition algorithms for reliable detection the type of spores of concern, modification of the illumination conditions or camera sensor exposure times, etc. Note that the nature of data collected by a particle monitor is vastly more complex than sensors of simple physical parameters like temperature and humidity; the dashed arrow in FIG. 8 has little motivation in such sensors. It is the complexity and variety of spore biology involved in particle monitor operation that motivates the dashed arrow of FIG. 8.

Bacteria and Mold in Human Occupied Buildings:

The above discussion of feedback loops to suppress the growth of mold or bacterial pathogens while maintaining a healthy environment for desired life forms may also be applied to human occupied buildings such as office buildings, housing complexes, hospitals, compound pharmaceutical facilities, or other critical environment where pathogenic control is a priority or highly important. For example, imagine an office building that is susceptible to an undesired and harmful mold. If and when airborne mold spores are detected the building, the Management Software may decide to modify building air temperature and humidity in such a way to minimize or reduce the ability of the spores to germinate.

Different areas of a building may run different "spore control" programs simultaneously and, or, at different times of the day depending on the occupants (foot traffic), mold remediation efforts, construction, occupant complaints including coughing and or moldy smells in winter, etc.

This scenario could also use data from sensors outside but near the building such that information about potential pathogens being brought inside the facility is taken into account. This could lead to running air purifiers and sanitizers differently in different entrances or high outdoor air risk exposure areas of the building, etc.

In a specific embodiment, systems and techniques provide for detecting pathogens and allergens in-situ, local, to an environment and providing actionable feedback (counts and alerts) upon detection of a threatening pathogen on the efficacy of a process, and, or, provide feedback on possible actions to be taken. In a specific embodiment, there is a dashboard that provides actionable data and feedback to the end user. More specifically actions affecting pathogen suppression efforts such as fungicide sprays, heat, lighting, humidity, wind speed, sound/vibrations; and such actions may also take into account readings from other sensors and, or calculations based on other "climate" (ambient) sensors local to the environment such as temperature, humidity, vapor pressure deficit (VPD), dew point, and other environmental parameters that affect pathogenic growth. Feedback is provided through a single software interface platform to the user such as Farm Management Software, who takes action or it can be part of an automated AI driven network with or without human interference at all, or some steps, of the actionable process and the processes themselves.

In a specific embodiment, a system includes one or more airborne particulate (bioaerosols) monitor that continuously collects and classifies particles local to an environment that affects an outcome (example: harvest yields in agriculture, produce quality) and a central computer provides data and/or suggestions for how best to control local disease through various methodologies and processes that are available to the end user. The end user may be referred to as a grower.

In a specific embodiment, systems and techniques provide automated feedback on the presence of fungal and bacterial spores/diseases as well as measuring how effective suppression and control efforts are, thus leading to increased crop yields, product quality, and improved process performance.

Fungal spores and bacteria have evolved over millennia to develop genes and more specifically "environmental" receptors that sense changes in the environment allowing these to live, adapt/survive, and reproduce. Fungi and bacteria have the ability to decimate crops in a short period of time under the right environmental conditions. Humans try to control and suppress their presence through various methods (sprays, lighting, heat, bio) but lack feedback in a reasonable timeframe on the efficacy of the process(es) employed in order to take further corrective action if needed because they rely on visual inspection or sampling results from a lab that may be days or weeks old.

Furthermore, there are many recalls of contaminated produce and drugs each year as these lack real-time or near real-time feedback on possible contamination/eradication of disease efforts while being processed.

Examples of contaminated produce include apples and table grapes looking good in cold storage but arriving rotten 2-3 weeks after shipment to a supermarket far away.

Overuse of sprays, or the same technique will eventually lead to pathogenic mutations requiring new chemistry or tweaks to the process for it to work and until a new combination is found the crops will continue to perish. Some recent examples includes citrus in Florida and bananas in central America.

Various "new" techniques are employed in agriculture besides pesticide sprays such as lighting changes (LEDs), sulfur burning pots for indoor medicinal *cannabis*, heat blast (Agrothermal), and others. These are promising but just like fungal and bactericidal sprays these also cannot be overused in treatments as crops may develop other side-effect issues and possible lead to faster mutations making disease resistant to said technique. These newer techniques are mostly used individually today as there's no clear understanding of how they can work together more efficiently as part of integrated pest management (IPM) systems with the principle of changing and alternating techniques to avoid possible disease/pathogen mutations and enhance changes of success in managing crop yield and quality. Their efficacy lacks feedback on pathogenic spore containment and in many cases these techniques can be combined right after each other if knowledge of process outcome is known.

For example: grower is experiencing Downy mildew in a crop and sprays a fungicide at early dawn hours on a Monday and, in a specific embodiment, a system records a decrease in spores per 24 hr count over the next 3 days but these remain above acceptable levels on Friday. The grower cannot spray again until next Monday (7 days after the 1st spray) because a new spray so soon will stress out the plant and crop, so instead of a spray they order to apply 605 nm red LED lights at "sunset" at 260 J/lm for 2 hrs on Friday, Saturday, and Sunday nights. Then on Monday evening apply a new fungicidal spray.

In another example, a grower may have the above condition but on Thursday a system, according to one or more embodiments, detects the start of *Botrytis* spores in the same crop/field. He cannot spray for *Botrytis* and using red LED lights won't help stop *Botrytis* spread because it responds to green light so a new call is made to add 2 hrs of green light after the red lights on Thursday, Friday, and Sunday nights. Or alternatively the grower may call out to apply green lights every other night since the disease was just detected for the first time this season ahead of harvest.

Below is a Discussion of Some Techniques and Items to Consider in Crop Disease Control:

- Sunlight: Plants have evolved to take advantage of sunlight for photosynthesis and maximize their productivity in various ways. Different plants take advantage of different wavelengths in sunlight to their benefit. However, fungal spores and other microbes cannot thrive in direct sunlight for extended periods of time and have adapted (using photoreceptors) to survive in the shade and dark places and wait until humidity and after sunset to then germinate and grow conidial or hyphal structures. Thus, opening up spaces between crops to allow for more and longer lasting sunlight helps decrease disease pressure/risk.
- Chemicals: Effective but over treatment leads to plant and crop stress leading to lower yields and, or quality as measured by flavor, color and other parameters. It can also lead to mutations where the spores become resistant to said chemicals and new formulations needed to combat the newly evolved disease. For example, sulfur may be used as a spray in outdoor agriculture but in the form of a sulfur burner (evaporator) indoors for medicinal *cannabis*. Overdoing it results in visible staining of the plant and crop and increases pH therefore leading to changes in crop taste.
- Artificial lighting: Indoor growers can utilize higher-intensity-discharge (HID) and light-emitting-diode (LED) grow lights (particularly quantum-dot LEDs) for growing crops in record time, all year long, and in higher yields/density per sqft of space. HIDs and LEDs provide plants with a substitute for sunlight. They also can mimic nighttime for crops. Most natural sunlight greenhouses do not use LED lighting especially if they are in latitudes that enjoy plenty of sunshine throughout the year. But some that do not may use complimentary LED lighting to supply extra hours of light at certain times of the year.
- Heat/cold shock: an example is Agrothermal Systems of Napa, Calif. who in last couple years is doing trials in outdoor fields in particular for vineyards it makes a pass between rows and blasts vines with 300 F degree air for 20 seconds killing spores and insects in this time frame, though adjustable to crops needs and current ambient air conditions since it's used in the open.

Research has shown changes on *Botrytis* spores due to heat. Overexposure to extreme heat will stress the plant and crop to the extreme these can die or have portions die.

Sound vibrations/Ultrasound: this technique has been used mostly in liquids to cause destructive cavitation of bacteria and fungal spores. In recent years, companies like Ziel *Cannabis* of San Francisco, Calif. deployed a combination of ultrasound and UV to sterilize/clean medicinal *cannabis* flowers after harvest. It is expensive and time consuming to deploy in scale. And at issue is that there is no knowing if the material to be processed contains a disease and how much, second is there is no knowing how effective the treatment has been until samples are tested in a lab for disease contamination. On the other hand, research has shown that certain low frequency vibrations, even earthquakes, lead to immediate spore release in very high quantities.

UV treatments: proven to work over the last few decades but technology is expensive at scale and requires full surface treatment/disinfection for it to be efficient.

Genetics: Different crops varietals have different responses to different disease. For example, *Botrytis cinerea* is a much bigger concern in Chardonnay grapes fields compared to Cabernet Sauvignon; yet powdery mildew affects them equally. Scientist have made advances in genetic cloning and genetically-modified-organism (GMO) techniques, but nonetheless these still suffer from disease to some extent or will require use of special formulations for GMO crops.

Very large and thick spore colonies: There is the issue of very thick and large spore colonies where the treatments described above are effective in thin and outer layers of the disease but not as effective when there are "thick clumps" of hyphal/conidial fungal structures, or thick colonies for bacteria, where the outer fungal or bacterial spores die but the inner fungal or bacterial spores survive death being protected by the dead ones surrounding them. When these are extreme in size it may be best to cut the stems and leaves these are attached to, or completely throw away the plant to decrease infection of others.

Vectors: insects are known to carry specific pollens, in some cases fungal spores and viruses from plants specific to the ones they feed on. In some cases, specific vectors may aid in potentially controlling other pests. The presence of a specific pathogen may alert the feedback loop to watch out for specific vectors coming into the greenhouse where the control method may extend beyond simple fungal, bacterial, viral control, but also alert to the potential presence of vectors which may need to be mitigated through insecticidal fumigation methods and, or the deployment of beneficial vectors that fight these. For example, detecting airborne spores of powdery mildew together with aphids that can carry the spores on them could be used to have a fast-feedback loop that calls for a fungal application of powdery mildew and the release of ladybugs that eat the aphids for natural biological control.

Environmental Controls: Unfortunately in many cases the same temperatures and humidity levels that aid in plant growth also help fungal and bacterial growth in their hosts. With the right data and AI, small adjustments could be made to the environment to squeeze a few more percentage gains before a crop is harvested or during transit to its final destination. Environmental controls also include airflow where having detecting insufficiency, inadequate, or lack of airflow can be adjusted to help dry out the facility and remove excess humidity, therefore decreasing risk of pathogenic spores and their growth.

Gases: Examples are indoor agriculture where $CO_2$ is pumped into a room to help plants breathe and also help shock kill fungi spores. In cold storage of harvested crops Ozone and $SO_2$ may be used to control pathogens. Typically it is not clear how effective the treatments are while in storage or transit.

In a specific embodiment, systems and techniques are implemented in the operation of indoor plant farms, such as green houses or "plant factories", in which a computer system receives input from sensors, including one or more airborne biological particle detectors, controls the plant environment (light, temperature, humidity, ventilation, etc.) and in which it is desirable to manage or eliminate damage from pathogenic molds or bacteria. The broad range of plant environment controls available to the Management Software provides opportunities for software innovation. The complexity of suppressing pathogenic growth while supporting plant growth is a challenge demanding software innovation and intelligent logic and components. In a specific embodiment, systems and techniques may interface with products provided by third party vendors such as LumiGrow and with Artemis Ag (formerly Agrilyst) of Brooklyn, N.Y. A grower may have at their disposal the use of natural biologicals such as other beneficial fungi and sometimes insects known to positively affect the biome and ecosystem such that these directly deprive the pathogenic disease spores and disease agents. Example of these are using Mycorrizhal and other beneficial bacteria, and Mycostop, as provided by AgBio, Inc.

Conventional methods for responding to disease are slow compared to the rapid disease response described above. Some conventional approaches require that samples be sent to a lab for testing, which may take days to get results. Other conventional approaches use of visual inspection (human or drone based) which is often only capable of identifying disease that is present over a large area and by comparing to what it was before to see if it is getting worse or better. Conventional approaches do not measure spores directly per some metric (volume of air/hr or days, etc).

In a specific embodiment, systems and techniques may be used in conjunction with a particle monitoring device to combine the power of such monitoring devices to detect spores with the biological sensitivity of spores to details of lighting and other environmental conditions. For example, spores may be inhibited from germinating by using lighting schemes that trick spores into remaining dormant and "thinking" that it is not the right season or conditions to germinate.

Over $76 billion in crops is lost each year due to fungal and bacterial diseases in crops. Over 3000 people die in the U.S. each year from food poisoning (over 120,000 in U.S. are hospitalized, and over 40 million get sick annually). Feedback on fungal and bacterial presence in crops and food during growth and processing is critical to contain and prevent outbreaks.

In a specific embodiment, there is a rapid response system for indoor applications including management software in communication with a sensor(s) and a control(s) wherein, the sensor(s) include a camera-sensor based detector of airborne pathogenic biological particles; the settings of the control(s) influence the rate of growth or lifecycle of biological pathogens; the management software rapidly responds to sensor detection of airborne pathogenic biological particles by influencing the rate of growth or lifecycles of biological pathogens via modification of control settings.

Indoor applications include indoor agriculture such as green houses and plant farms, as well as office and residential buildings. Additional sensors may include temperature sensors, humidity sensors, airflow sensors, gas sensors such as $CO_2$ level sensors, cameras imaging plants to monitor plant growth and health, etc. In a specific embodiment, the disclosed systems and techniques are used with a camera-sensor-based particle detector having one or more of an RGB camera sensor, ambient air intake slot, removable media cartridge, local processor to either interpret images or transmit images to the cloud, algorithms that distinguish between types of particles.

Airborne pathogenic biological particles may be mold spores of various types. Bacterial particles and pollen are other possibilities. In a specific embodiment, disclosed systems and techniques are applied to address spores of molds that cause agricultural plant diseases. In another specific embodiment, disclosed systems and techniques are applied to address molds that trouble humans in office and residential buildings.

Controls may include lighting control, temperature control, humidity control, airflow control, $CO_2$ level control, plant nutrient and water controls, building HVAC controls etc. There are many dimensions to lighting control including intensity, spectrum and timing. Management software may reside in a local server or on the cloud, or some combination thereof.

"Rapid" may be less than a day, less than several hours, less than an hour, within minutes, etc. Response may be fully automated, or limited to issuing alerts to the user. Pathogenic mold spores have evolved to make decisions based on environmental conditions as to when to proceed through its life cycle and when to remain dormant. Controls may be manipulated to trick the spore into deciding to remain dormant. In a specific embodiment, at least one step in rapid response is electronically driven and/or driven autonomously by machine learning. This helps to reduce delay in analysis due to involvement of humans in the collection of spores.

"Airborne Spore Density" and "Thresholds"

Figure 9:
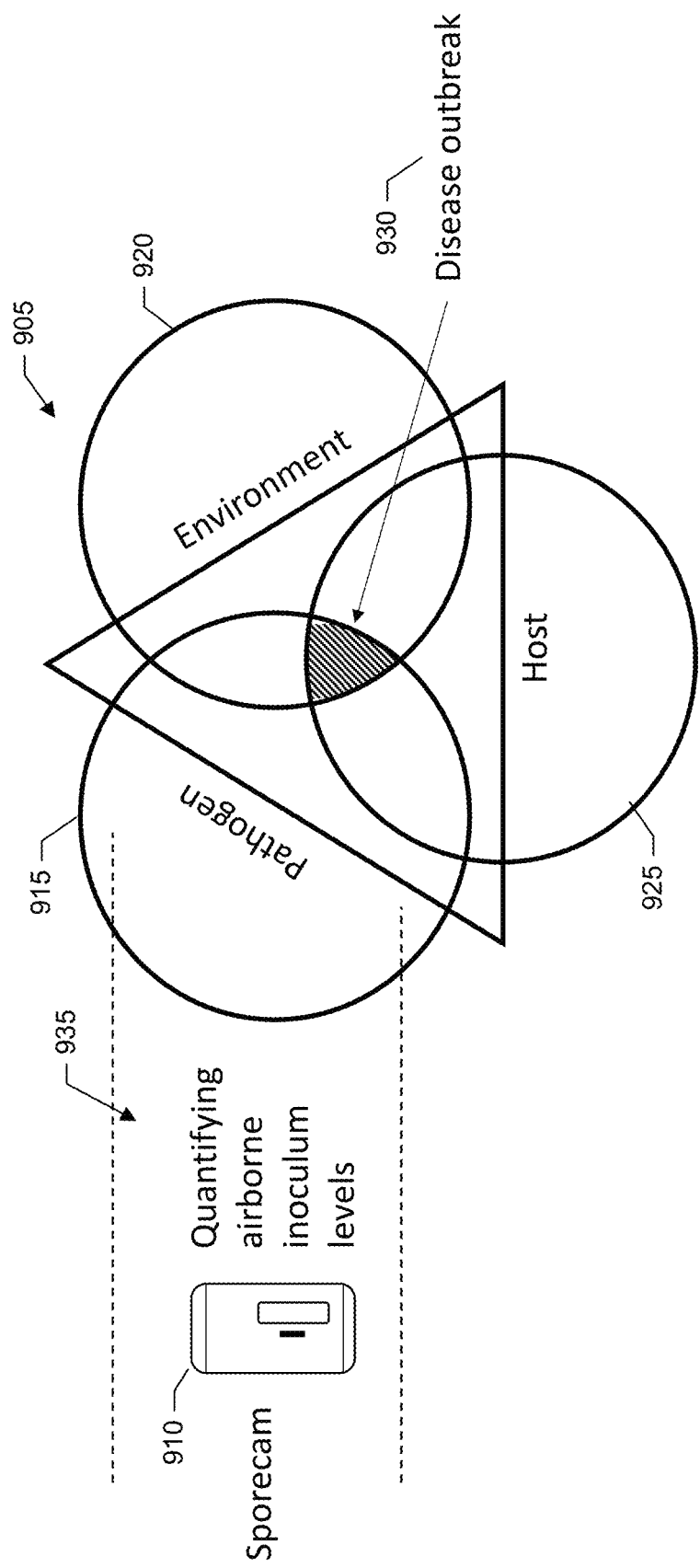
FIG. 9 shows a disease triangle, according to one or more embodiments.

FIG. 9 shows a disease triangle 905 that may be addressed by a monitor 910. The disease triangle includes pathogens 915, environment 920, and host (e.g., crops) 925. An overlapping of pathogens, environmental conditions, and host conditions can cause a disease outbreak 930. In a specific embodiment, the monitor quantifies airborne inoculum levels. In a specific embodiment, the particle monitor provides quantitative measurements of airborne spore density and such quantitative measurement enable the use of thresholds. The monitor provides the unique ability to report airborne spore density and map symptom start through establishment of thresholds (green/yellow/red) by pathogen, crop, and environmental condition. The monitor can provide CEA growers with quantification of a critical side 935 of the "disease triangle." In a specific embodiment, there is a method to quantify airborne spore density continually over time. In a specific embodiment, systems and techniques provide for developing/mapping, for the first time, the relationship between "airborne spore density"—"ASD" and "disease onset" or symptoms of infection on host.

ASD Versus Onset and Thresholding

Figure 10:
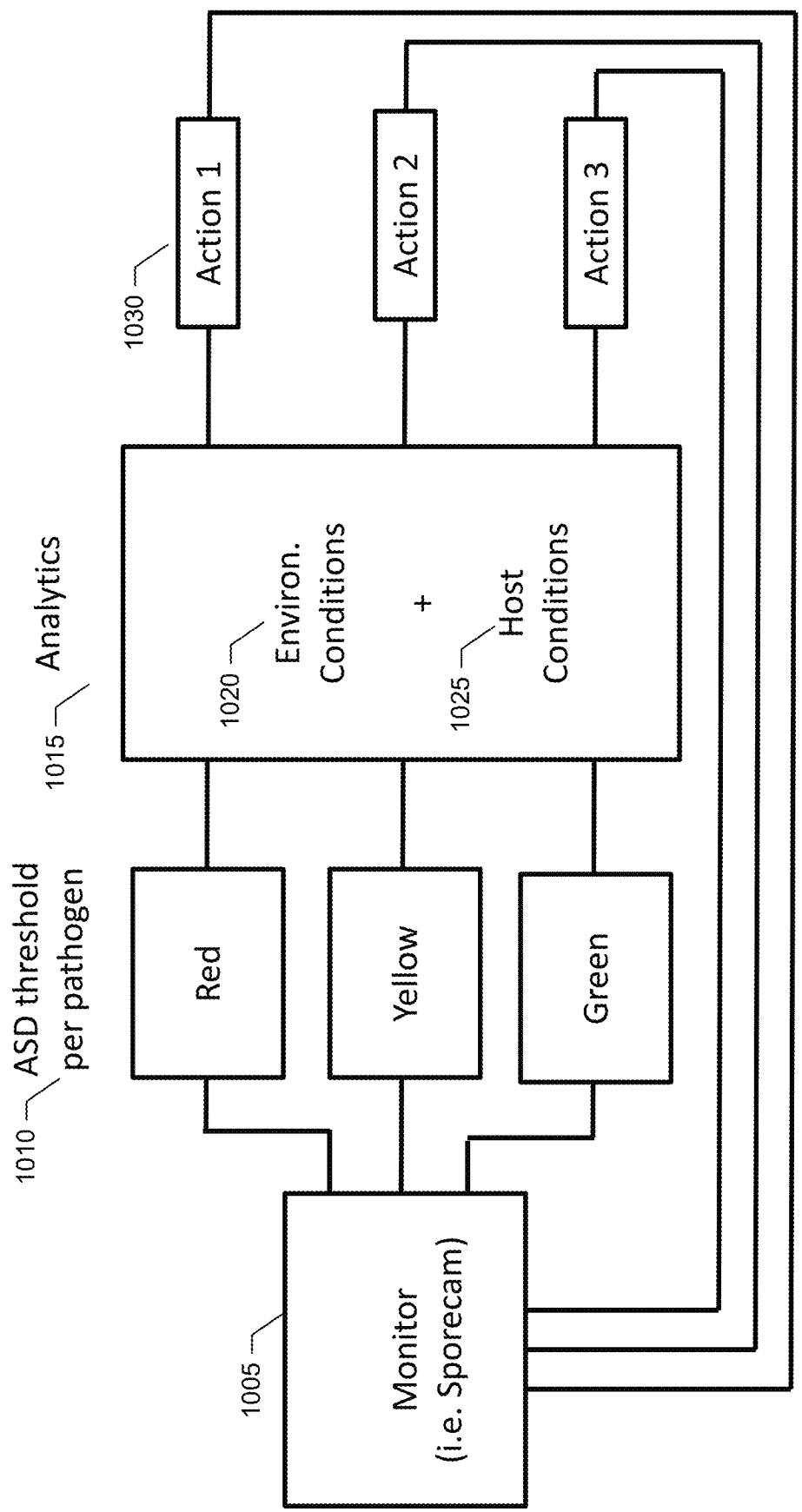
FIG. 10 shows a block diagram representing a working disease triangle system, according to one or more embodiments.

FIG. 10 shows a block diagram representation of a working disease triangle system. In the example shown in FIG. 10, there is a monitor 1005. The monitor allows for configuration of airborne spore density thresholds per pathogen 1010. For example, threshold levels can be set indicating increasing levels of threat of an outbreak (e.g., green, yellow, and red). A first plurality of ASD threshold levels may be set for a first type of pathogen. A second plurality of ASD threshold levels, different from the first plurality of ASD threshold levels, may be set for a second type of pathogen, different from the first type of pathogen.

It should be appreciated that the specific colors such as a green, yellow, and red are merely for purposes of example. A grower may configure and associate threshold levels to correspond to any color (e.g., orange or blue). In a specific embodiment, the different threshold levels are set according to a 3-color scheme. In a specific embodiment, there are at least three different colors that may be set to correspond to three different threshold levels. It should be appreciated, however, that in other embodiments there can be more than three threshold levels, such as a 4, 5, or more than 5 threshold levels. Thus, there can be a 4-color scheme, or 5-color scheme, and so forth. The alerting scheme and threshold could have different colors and thresholds. The grower may setup these thresholds rather than the AI.

An analytics unit 1015 associated with the monitor processes determined ASD threshold levels of a particular pathogen with data about environmental conditions 1020 and host conditions 1025 to output one or more actions 1030 to perform in order to reduce a likelihood of a disease outbreak.

In a specific embodiment, systems and techniques are provided to show a relationship between monitoring in-situ and developing thresholding by pathogen in combination with environmental/host condition data streams which exist today/common in CEA facilities.

Figure 11:
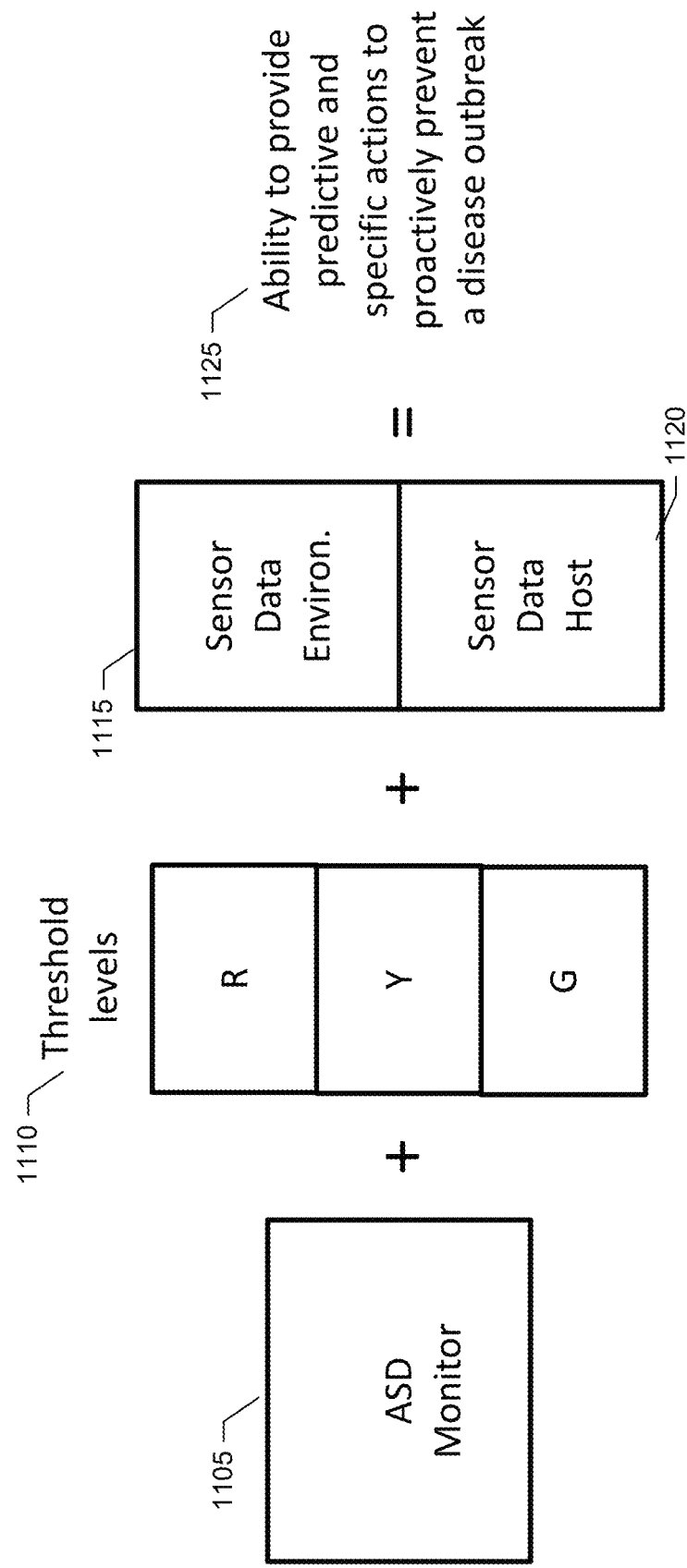
FIG. 11 shows a block diagram in which an (airborne spore density (ASD)) monitor provides predictive and specific actions to proactively prevent a disease outbreak, according to one or more embodiments.

FIG. 11 shows a block diagram in which an ASD monitor 1105 uses threshold levels 1110, sensor data 1115 about environmental conditions, and sensor data 1120 about host conditions to provide predictive and specific actions to proactively prevent a disease outbreak 1125.

Figure 12:
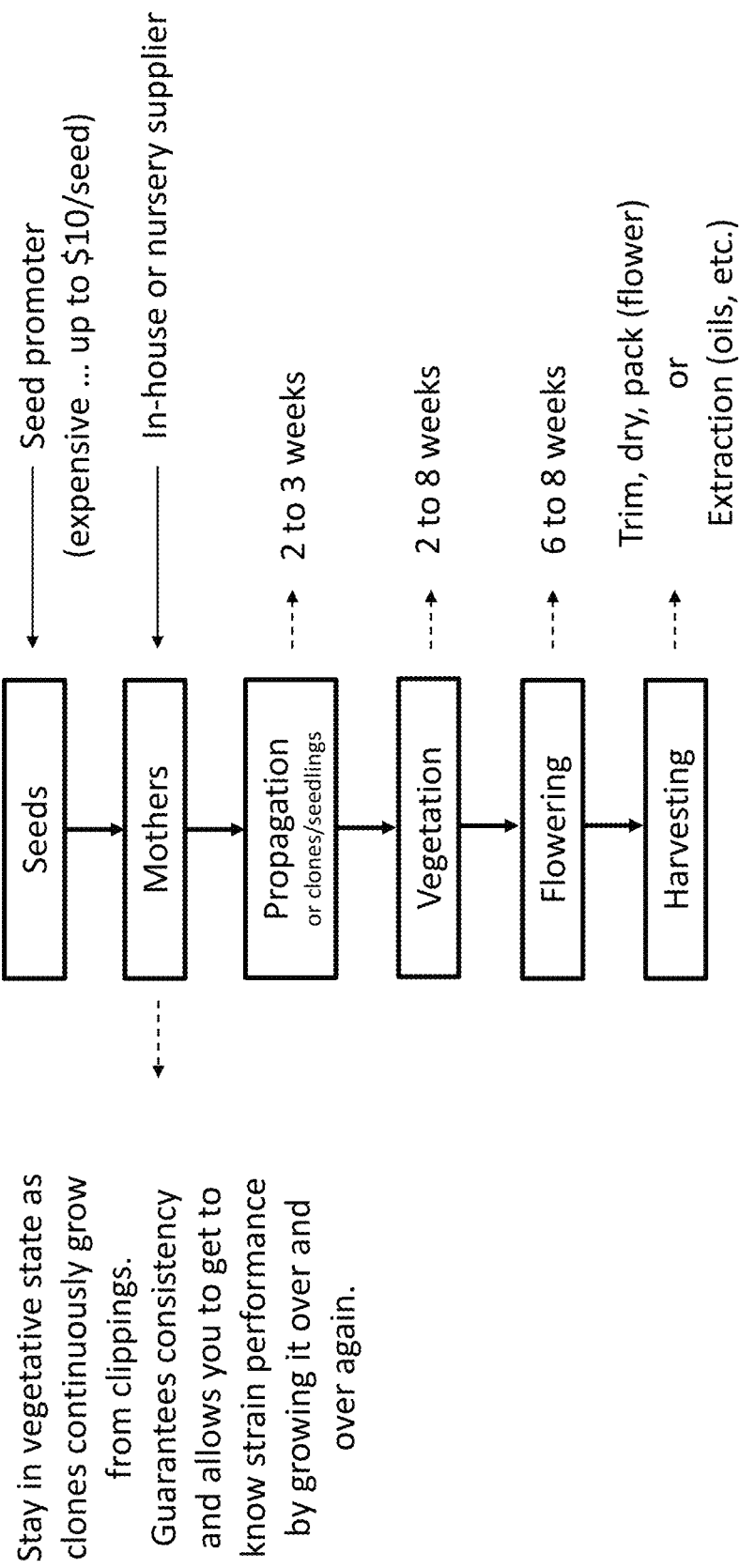
FIG. 12 shows a flow chart of agricultural activity, according to one or more embodiments.

FIG. 12 shows a flowchart of agricultural activity. The example of agricultural activity show phenology stages for the growing of hemp or *cannabis*. In a specific embodiment, there is a stay in vegetative state as clones continuously grow from clippings. This helps to guarantee consistency and allows a grower to become familiar with strain performance by growing it repeatedly. Interestingly, in this context, pollen from male hemp plants are effectively a pathogen as the most valuable crop is from virgin flowers. Virgin flowers rapidly go do seed after fertilization with pollen. So in some agricultural applications, it is a great advantage that detectors, as described herein, are effective at detecting both fungal spores and pollen.

Figure 13:
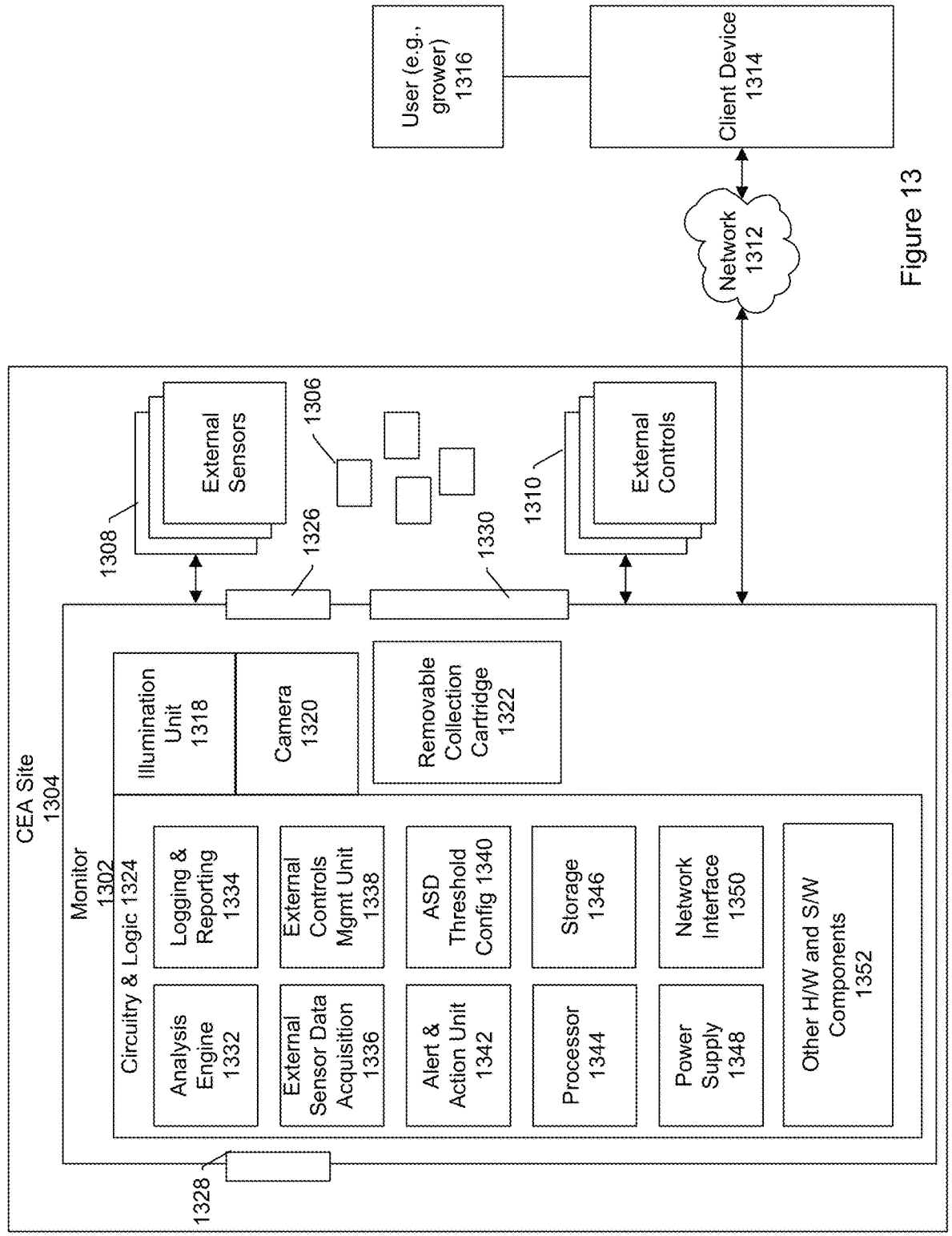
FIG. 13 shows a block diagram of a monitor device deployed to a controlled environment agriculture (CEA) site, according to one or more embodiments.

FIG. 13 shows a block diagram of a monitor device 1302 deployed to a CEA site 1304. The CEA site includes crops 1306, any number of sensors 1308 external to the monitor, and any number of controls 1310 external to monitor. The crops may be referred to as hosts.

This monitoring device is designed to collect, analyze, classify, and identify or discriminate airborne particles of interest or concern at the CEA site. In a specific embodiment, the monitor is connected via communication links to the external sensors and controls. The communication link may be a hardwire link (e.g., Ethernet cable) or wireless communication link (e.g., WiFi or Bluetooth). The external sensors may include temperature sensors, humidity sensors, light detectors, surveillance cameras, other types of agricultural sensors, or combinations of these. There can be external sensors responsible for collecting data on environmental conditions at the CEA site. There can be external sensors responsible for collecting data on crop (e.g., host) conditions at the CEA site. The external controls may include lighting systems, window control systems, irrigation systems, fungicide dispensing systems, other types of agricultural controls, or combinations of these.

The monitor analyzes the collected particles in conjunction with data collected from the external sensors to make decisions or determinations on what actions should be undertaken in order to prevent an outbreak of a disease. In a specific embodiment, the monitor physically detects airborne pathogens before infestation enabling preventative action. The monitor captures, inspects, classifies and alerts growers of the presence of harmful airborne pathogen spores. The result is growers can take preventative actions, optimize pest management practices, minimize yield losses and have efficacy proof that their actions are working to control disease. In a specific embodiment, the CEA site is an indoor agriculture farm. Airborne particles of interest may include biological particles associated with an agricultural pathogen. Some examples of biological particles include bacteria, mold, spores, and so forth.

The monitor device is connected via a network 1312 to a client device 1314 of a user (e.g., grower) 1316. The network may include any type of network, including by way of example a global computer network such as the Internet, a wide area network (WAN), a local area network (LAN), a satellite network, a telephone or cable network, a cellular network, a wireless network such as a WiFi or WiMAX network, or various portions or combinations of these and other types of networks.

The client device is a computing device that may include a display. Examples of client devices include smartphones, portable communication devices, tablet computing devices, laptops, desktops, or other types of processing devices capable of communicating with the monitor.

The monitor includes an illumination unit 1318, camera or camera sensor 1320, removable collection cartridge 1322, and circuitry and logic 1324. These components are contained within a housing of the monitor. It should be appreciated that the blocks, modules, and components shown in FIG. 13 may be functional and there can be many different hardware and software configurations to implement the functions described. For example, in a specific embodiment, data is transmitted from the monitor to a cloud service for analysis. An example of a cloud service is Amazon Web Services (AWS) as provided by Amazon of Seattle, Wash. In this specific embodiment, one or more code components of the system (e.g., analysis engine) may reside and execute in the cloud service.

The housing includes an air intake opening 1326, an air exhaust opening 1328, and a cartridge opening 1330. Ambient air is drawn through the air intake opening towards the collection cartridge and out the air exhaust opening. Airborne particles that may be present in the air are trapped within the collection cartridge. The cartridge opening allows the collection cartridge to be removed and replaced with a new cartridge.

The monitor applies imaging techniques in order to discriminate, classify, or identify particles that have been collected. In particular, the illumination unit is responsible for directing certain wavelengths of light or radiation at the particles. The camera captures images of the particles under various lighting conditions. The light may include visible light, non-visible light, ultraviolet (UV) light, white light, red light, green light, blue light, yellow light, or combinations of these. The images are examined to identify the particles based on their morphological and spectral signatures, e.g., how the particles emit, reflect, transmit, or absorb different wavelengths of light.

The circuitry and logic includes an analytics engine 1332, logging and reporting unit 1334, external sensor data acquisition unit 1336, external controls management unit 1338, ADS threshold configuration unit 1340, alert and action unit 1342, processor 1344, storage 1346, power supply 1348, network interface 1350, and other hardware and software components 1352 (e.g., motor, blower, antenna, ports (e.g., universal serial bus (USB) ports), global positioning sensor (GPS), memory, and so forth).

The ASD threshold configuration unit stores settings corresponding to various airborne spore density levels per pathogen. In a specific embodiment, airborne spore density may be expressed as a number of pathogenic particles detected per volume (e.g., liter) of intake air analyzed over a time period. Different types of pathogens can be more or less lethal based on their concentrations. Thus, the ASD threshold configuration unit allows for establishing different ASD threshold levels for different pathogens.

Figure 14:
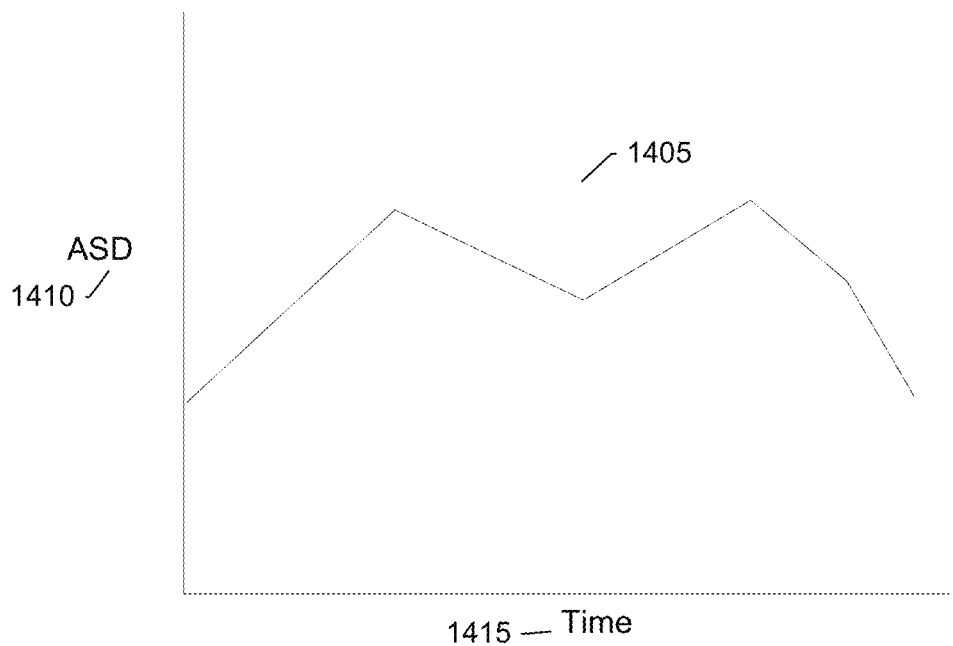
FIG. 14 shows a graph plotting airborne spore density over time, according to one or more embodiments.

The logging and reporting unit is responsible for recording determinations of ASD over time and generating reports, charts, or graphs. For example, FIG. 14 shows an example of a line chart 1405 plotting ASD levels 1410 of a particular pathogen as measured over time 1415.

Referring back now to FIG. 13, the external sensor data acquisition unit is responsible for collecting and receiving streams of data from the external sensors. Such data may include, for example, temperature data, humidity data, and other data about climate and crop (e.g., host) conditions at the CEA site.

The analysis engine includes algorithms to measure and determine ASD levels based on the volume of air drawn through the monitor over time. The analysis engine evaluates the determined ASD levels of a particular pathogen in conjunction with data streams received from the external sensors.

The action and alert unit is responsible for generating alerts, actions, or both based on the evaluation by the analysis engine. An alert may include, for example, a message transmitted to the client device and recommended action (e.g., "Alert: likelihood of a disease outbreak is high, recommend application of fungicide."). In another specific embodiment, an action control signal or command may be automatically transmitted to an external control. For example, the external control may include a fungicide dispensing system at the CEA site. The fungicide dispensing system, upon receiving a command from the monitor, automatically dispenses a fungicide on the crops. As another example, the external control may include a lighting system. The lighting system, upon receiving a command from the monitor, automatically adjusts lighting conditions at the CEA site.

FIG. 15 shows a flow of a process for rapid disease response according to one or more embodiments. In a step 1510, a monitor is deployed to a CEA site (e.g., indoor agricultural farm) to perform in-situ monitoring of airborne spore density (ASD) associated with a pathogen.

In a step 1515, the monitor is configured with ASD threshold levels corresponding to a set of pathogens. The ADS threshold levels may be pre-configured such as at a manufacturing facility of the monitor. Instead or additionally, ASD threshold levels may be configured via a user interface or smartphone app that connects to the monitor device. There can be over the air (OTA) updates transmitted to the monitoring device.

In a step 1520, communications are established between the monitor and external sensors and controls. In a step 1525, data streams are received from the external sensors. In a step 1530, a determination is made that a particular ASD threshold level associated with a particular pathogen has been reached. Based on the determination and data from the data streams generated by the external sensors, an alert may be generated and transmitted to the grower (step 1535), a command may be issued to an external control to perform an action (step 1540), or both.

In a specific embodiment, there is a rapid response system for controlled environment agriculture (CEA) applications, the rapid response system comprising management software in communication with one or more sensor and one or more controls, wherein the one or more sensors include a camera-sensor based detector of airborne pathogenic biological particles; wherein settings of one or more controls influence the rate of growth or lifecycle of biological pathogens; and wherein the management software rapidly responds to sensor detection of airborne pathogenic biological particles by influencing at least one of a rate of growth or lifecycles of biological pathogens via modification of the control settings.

In an embodiment, sensor detection of pathogenic biological particles and response of management software occur within an asymptomatic phase of a fungal infection. In an embodiment, a first cycle of pathogen detection and response by the management software is followed by a second cycle of pathogen detection and response by the management software, each of the first and cycles being within the asymptomatic phase of a fungal infection.

In an embodiment, at least one camera-sensor based detector is placed inside a greenhouse and at least one other camera-sensor based detector is placed outside the greenhouse, and wherein windows of the greenhouse for cool air circulation are only opened if the at least one other camera-sensor based detector outside the greenhouse indicates that outside air is free of pathogens of concern.

In an embodiment, at least one camera-sensor based detector is placed inside a greenhouse and at least one other camera-sensor based detector is placed outside the greenhouse, and wherein data from the camera-sensor based detector is used to determine one or more of when windows of the greenhouse should be opened, a duration that the windows should remain open, whether the windows should remain closed, or whether the greenhouse should be cooled using a technique other than opening the windows.

In an embodiment, before a pathogen is detected, the management software uses measurements from climate-condition sensors to determine which pathogens of concern are most likely to become active and then optimizes settings of the camera-sensor based detector for detection of those pathogens that are most likely to become active.

In an embodiment, the modification of control settings includes application of fungicides. In an embodiment, the modification of control settings is done automatically. In an embodiment, the modification of control settings comprises at least one modification being based on one or more inputs from a user and at least one other modification being autonomous. In an embodiment, the modification of control settings is done manually by a human operator in response to an alert from the management software. In an embodiment, at least one camera-based detector is mounted on at least one of a robot or a drone.

In another specific embodiment, there is a method comprising: deploying a camera-based detector in a controlled environment agricultural (CEA) site to perform in-situ monitoring of airborne spore density (ASD) associated with a pathogen; configuring a plurality of threshold levels for the ASD; establishing communications between the camera-based detector and a plurality of sensors, the plurality of sensors collecting data about environmental conditions in the CEA site and data about crop conditions of crops in the CEA site; receiving a first data stream about the environmental conditions from a first sensor; receiving a second data stream about the crop conditions from a second sensor; determining that a particular threshold level has been reached; and based on the particular threshold level that has been reached, the first data stream, and the second data stream, generating an alert indicating that a grower of the crops undertake a particular action to prevent an outbreak of a disease from the pathogen.

In a specific embodiment, wherein the alert is displayed in one of a plurality of colors, the plurality of colors including a first color to indicate a first likelihood of the outbreak, a second color, different from the first color, to indicate a second likelihood of the outbreak, or a third color, different from the first and second colors, to indicate a third likelihood of the outbreak, wherein the first likelihood is greater than the second and third likelihoods, and the second likelihood is greater than the third likelihood, and wherein a number of colors in the plurality of colors is at least three. For example, the alert may be displayed in one of a red color to indicate a first likelihood of the outbreak, a yellow color to indicate a second likelihood of the outbreak, or a green color to indicate a third likelihood of the outbreak, wherein the first likelihood is greater than the second and third likelihoods, and the second likelihood is greater than the third likelihood.

In a specific embodiment, the camera-based detector is a first camera-based detector and the method comprises: deploying a second camera-based detector outside a greenhouse having the crops; monitoring, by the second camera-based detector, the airborne spore density in ambient air outside the greenhouse; and displaying, on a portable electronic device, a status corresponding to the airborne spore density in the ambient air outside the greenhouse to indicate whether windows of the greenhouse should remain shut because of the airborne spore density in the ambient air.

The method may include reporting the airborne spore density. The method may include logging the airborne spore density over time. In another specific embodiment, the method includes generating a map comprising a relationship between the airborne spore density and symptoms of infection on the crops. In another specific embodiment, the method includes generating an electronic data set representing the relationship between spore density and symptoms of infection on the crops.

In another specific embodiment, there is a method of operating a fast feedback loop system comprising: detecting airborne spores over time to generate spore data; correlating the spore data to one or more other inputs of the fast feedback loop system based on times of the one or more other inputs and times of airborne spore detections; and sending an alert based on the correlation. In another specific embodiment, the airborne spores are detected over time and data is correlated to other inputs in the fast feedback loop/system based on when these were mapped in time to each other. In other words, the timing of the spore data is combined with other inputs to send alerts via the system or AI, and so forth.

In another specific embodiment, there is a fast feedback system comprising processes and intelligence which, when executed, instruct a spore detector to modify its scanning settings to enhanced detection of specific pathogens of interest based on one or more other parameters of the fast feedback system, wherein one or more specific pathogen sensors are instructed to scan in one or more different ways based on at least one of locations of the specific pathogen sensors within a greenhouse or type of crop in the greenhouse. In another specific embodiment, a fast feedback system/process/intelligence tells the spore detector to modify its scanning settings to enhanced detection of specific pathogens of interest based on other parameters in the fast feedback system. It can tell one or more specific pathogen sensors to scan in different ways also per where they are located or per the crop in the greenhouse if the greenhouse has many different crops and or many different ways to control it and measure it.

Figure 17:
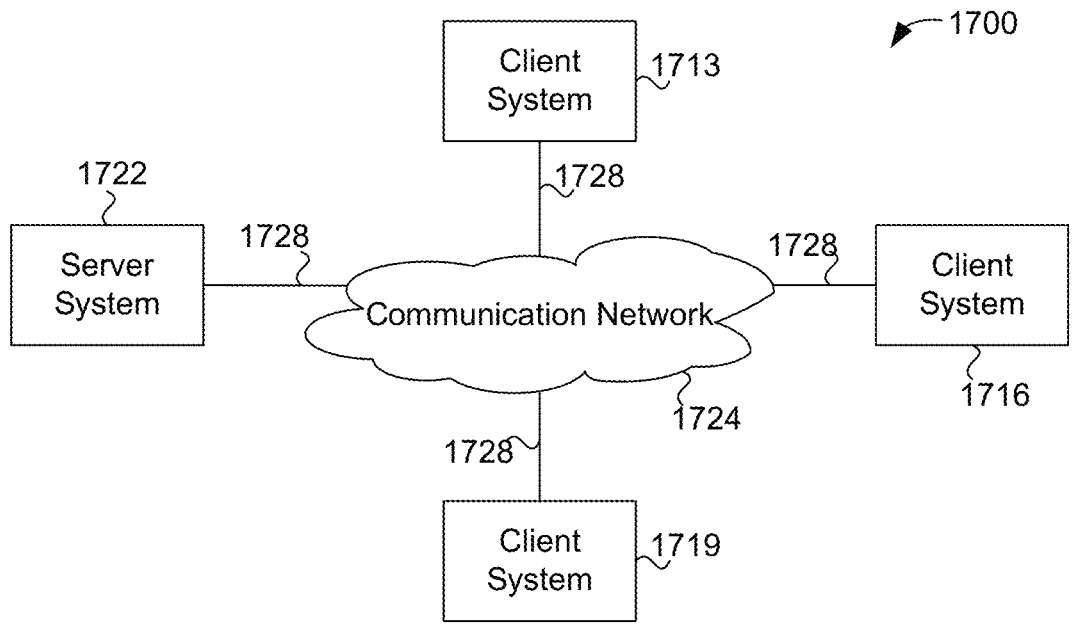
FIG. 17 shows a block diagram of a client-server system and network in which an embodiment of the system may be implemented.

FIG. 17 is a simplified block diagram of a distributed computer network 1700 that may be used in a specific embodiment of the system. Computer network 1700 includes a number of client systems 1713, 1716, and 1719, and a server system 1722 coupled to a communication network 1724 via a plurality of communication links 1728. There may be any number of clients and servers in a system. Communication network 1724 provides a mechanism for allowing the various components of distributed network 1700 to communicate and exchange information with each other.

Communication network 1724 may itself be comprised of many interconnected computer systems and communication links. Communication links 1728 may be hardwire links, optical links, satellite or other wireless communications links, wave propagation links, or any other mechanisms for communication of information. Various communication protocols may be used to facilitate communication between the various systems shown in FIG. 17. These communication protocols may include TCP/IP, HTTP protocols, wireless application protocol (WAP), vendor-specific protocols, customized protocols, and others. While in one embodiment, communication network 1724 is the Internet, in other embodiments, communication network 1724 may be any suitable communication network including a local area network (LAN), a wide area network (WAN), a wireless network, an intranet, a private network, a public network, a switched network, and combinations of these, and the like.

Distributed computer network 1700 in FIG. 17 is merely illustrative of an embodiment and is not intended to limit the scope of the embodiment as recited in the claims. One of ordinary skill in the art would recognize other variations, modifications, and alternatives. For example, more than one server system 1722 may be connected to communication network 1724. As another example, a number of client systems 1713, 1716, and 1719 may be coupled to communication network 1724 via an access provider (not shown) or via some other server system.

Client systems 1713, 1716, and 1719 enable users to access and query information stored by server system 1722. In a specific embodiment, a "Web browser" application executing on a client system enables users to select, access, retrieve, or query information stored by server system 1722. Examples of web browsers include the Internet Explorer® browser program provided by Microsoft® Corporation, Chrome® browser provided by Google®, and the Firefox® browser provided by Mozilla® Foundation, and others. In another specific embodiment, an iOS App or an Android® App on a client tablet enables users to select, access, retrieve, or query information stored by server system 1722. Access to the system can be through a mobile application program or app that is separate from a browser.

A computer-implemented or computer-executable version of the system may be embodied using, stored on, or associated with computer-readable medium or non-transitory computer-readable medium. A computer-readable medium may include any medium that participates in providing instructions to one or more processors for execution. Such a medium may take many forms including, but not limited to, nonvolatile, volatile, and transmission media. Nonvolatile media includes, for example, flash memory, or optical or magnetic disks. Volatile media includes static or dynamic memory, such as cache memory or RAM. Transmission media includes coaxial cables, copper wire, fiber optic lines, and wires arranged in a bus. Transmission media can also take the form of electromagnetic, radio frequency, acoustic, or light waves, such as those generated during radio wave and infrared data communications.

For example, a binary, machine-executable version, of the software of the present system may be stored or reside in RAM or cache memory, or on a mass storage device. The source and/or executable code of the software may also be stored or reside on a mass storage device (e.g., hard disk, magnetic disk, tape, or CD-ROM). As a further example, code may be transmitted via wires, radio waves, or through a network such as the Internet.

A client computer can be a smartphone, smartwatch, tablet computer, laptop, wearable device or computer (e.g., Google Glass), body-borne computer, or desktop.

Figure 18:
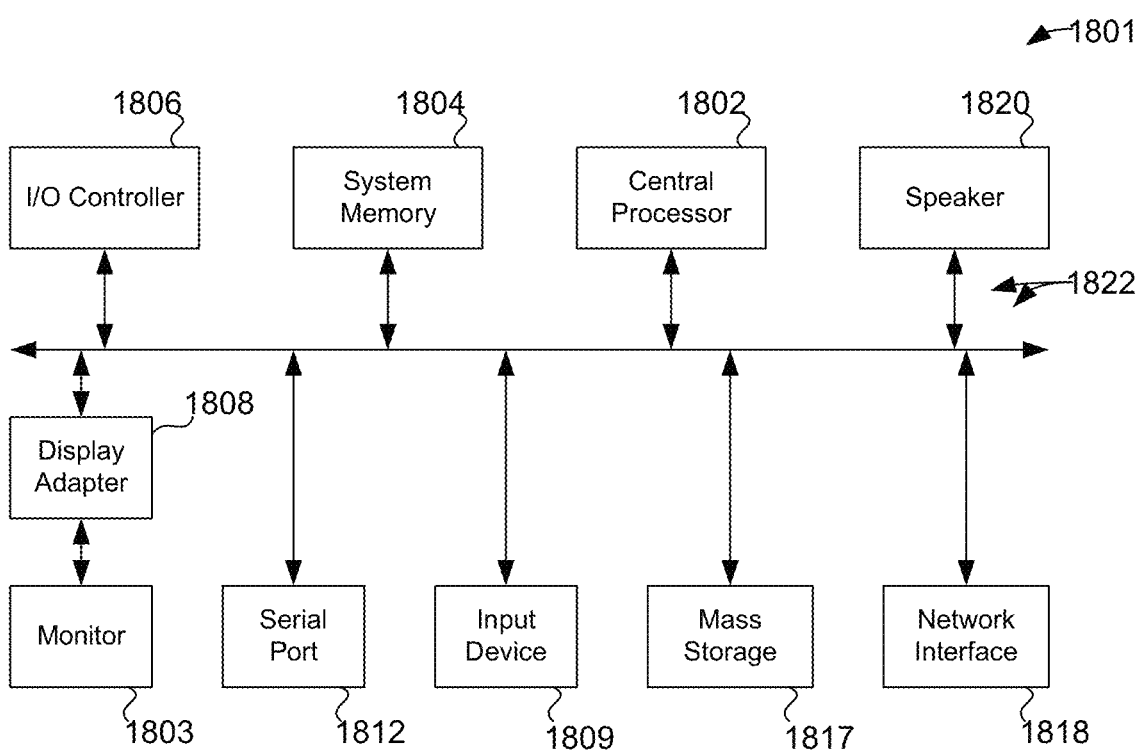
FIG. 18 shows a system block diagram of a client computer system.

FIG. 18 shows a system block diagram of computer system 1801. Computer system 1801 includes monitor 1803, input device (e.g., keyboard, microphone, or camera) 1809, and mass storage devices 1817. Computer system 1801 further includes subsystems such as central processor 1802, system memory 1804, input/output (I/O) controller 1806, display adapter 1808, serial or universal serial bus (USB) port 1812, network interface 1818, and speaker 1820. In an embodiment, a computer system includes additional or fewer subsystems. For example, a computer system could include more than one processor 1802 (i.e., a multiprocessor system) or a system may include a cache memory.

Arrows such as 1822 represent the system bus architecture of computer system 1801. However, these arrows are illustrative of any interconnection scheme serving to link the subsystems. For example, speaker 1820 could be connected to the other subsystems through a port or have an internal direct connection to central processor 1802. The processor may include multiple processors or a multicore processor, which may permit parallel processing of information. Computer system 1801 shown in FIG. 18 is but an example of a suitable computer system. Other configurations of subsystems suitable for use will be readily apparent to one of ordinary skill in the art.

Computer software products may be written in any of various suitable programming languages, such as Python, C, C++, C#, Pascal, Fortran, Perl, Matlab® (from MathWorks), SAS, SPSS, JavaScript®, AJAX, Java®, SQL, and XQuery (a query language that is designed to process data from XML files or any data source that can be viewed as XML, HTML, or both). The computer software product may be an independent application with data input and data display modules. Alternatively, the computer software products may be classes that may be instantiated as distributed objects. The computer software products may also be component software such as Java Beans® (from Oracle Corporation) or Enterprise Java Beans® (EJB from Oracle Corporation). In a specific embodiment, a computer program product is provided that stores instructions such as computer code to program a computer to perform any of the processes or techniques described.

An operating system for the system may be iOS by Apple®, Inc., Android by Google®, one of the Microsoft Windows® family of operating systems (e.g., Windows NT®, Windows 2000®, Windows XP®, Windows XP® x64 Edition, Windows Vista®, Windows 7®, Windows CE®, Windows Mobile®, Windows 8), Linux, HP-UX, UNIX, Sun OS®, Solaris®, Mac OS X®, Alpha OS®, AIX, IRIX32, or IRIX64. Other operating systems may be used. Microsoft Windows® is a trademark of Microsoft® Corporation.

Furthermore, the computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of the system using a wireless network using a protocol such as Wi-Fi (IEEE standards 802.11, 802.11a, 802.11b, 802.11e, 802.11g, 802.11i, and 802.11n, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

In the description above and throughout, numerous specific details are set forth in order to provide a thorough understanding of an embodiment of this disclosure. It will be evident, however, to one of ordinary skill in the art, that an embodiment may be practiced without these specific details. In other instances, well-known structures and devices are shown in block diagram form to facilitate explanation. The description of the preferred embodiments is not intended to limit the scope of the claims appended hereto. Further, in the methods disclosed herein, various steps are disclosed illustrating some of the functions of an embodiment. These steps are merely examples, and are not meant to be limiting in any way. Other steps and functions may be contemplated without departing from this disclosure or the scope of an embodiment. Other embodiments include systems and non-volatile media products that execute, embody or store processes that implement the methods described above.

What is claimed is:

1. A rapid response system for controlled environment agriculture (CEA) applications, the rapid response system comprising management software in communication with one or more sensors and one or more controls, wherein the one or more sensors include a camera-sensor based detector of airborne pathogenic biological particles;

wherein settings of one or more controls influence a rate of growth or lifecycle of biological pathogens;

wherein the management software rapidly responds to sensor detection of airborne pathogenic biological particles by influencing at least one of the rate of growth or lifecycles of biological pathogens via modification of the control settings;

wherein at least one camera-sensor based detector is placed inside a greenhouse and at least one other camera-sensor based detector is placed outside the greenhouse; and wherein windows of the greenhouse for cool air circulation are only opened if the at least one other camera-sensor based detector outside the greenhouse indicates that outside air is free of pathogens of concern.

2. The rapid response system as in claim 1 wherein sensor detection of pathogenic biological particles and response of management software occur within an asymptomatic phase of a fungal infection.

3. The rapid response system as in claim 2 wherein a first cycle of pathogen detection and response by the management software is followed by a second cycle of pathogen detection and response by the management software, each of the first and second cycles being within the asymptomatic phase of a fungal infection.

4. The rapid response system of claim 1 wherein the modification of control settings includes application of fungicides.

5. The rapid response system of claim 1 wherein the modification of control settings is done automatically.

6. The rapid response system of claim 1 wherein the modification of control settings comprises at least one modification being based on one or more inputs from a user and at least one other modification being autonomous.

7. The rapid response system of claim 1 wherein the modification of control settings is done manually by a human operator in response to an alert from the management software.

8. The rapid response system of claim 1 wherein at least one camera-based detector is mounted on at least one of a robot or a drone.

9. A rapid response system for controlled environment agriculture (CEA) applications, the rapid response system comprising management software in communication with one or more sensors and one or more controls, wherein the one or more sensors include a camera-sensor based detector of airborne pathogenic biological particles;

wherein settings of one or more controls influence a rate of growth or lifecycle of biological pathogens;

wherein the management software rapidly responds to sensor detection of airborne pathogenic biological particles by influencing at least one of the rate of growth or lifecycles of biological pathogens via modification of the control settings;

wherein at least one camera-sensor based detector is placed inside a greenhouse and at least one other camera-sensor based detector is placed outside the greenhouse; and wherein data from the camera-sensor based detector is used to determine one or more of when windows of the greenhouse should be opened, a duration that the windows should remain open, whether the windows should remain closed, or whether the greenhouse should be cooled using a technique other than opening the windows.

10. A rapid response system for controlled environment agriculture (CEA) applications, the rapid response system comprising management software in communication with one or more sensors and one or more controls, wherein the one or more sensors include a camera-sensor based detector of airborne pathogenic biological particles;

wherein settings of one or more controls influence a rate of growth or lifecycle of biological pathogens;

wherein the management software rapidly responds to sensor detection of airborne pathogenic biological particles by influencing at least one of the rate of growth or lifecycles of biological pathogens via modification of the control settings; and wherein before a pathogen is detected, the management software uses measurements from climate-condition sensors to determine which pathogens of concern are most likely to become active and then optimizes settings of the camera-sensor based detector for detection of those pathogens that are most likely to become active.

\* \* \* \* \*